United States Patent
Chidambaram et al.

(10) Patent No.: US 12,423,935 B1
(45) Date of Patent: Sep. 23, 2025

(54) 3D POINT-CLOUD LABELING

(71) Applicant: Amazon Technologies, Inc., Seattle, WA (US)

(72) Inventors: Subramanian Chidambaram, Sunnyvale, CA (US); Alex Williams, Johnson City, TN (US); Li Erran Li, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

(21) Appl. No.: 18/476,181

(22) Filed: Sep. 27, 2023

(51) Int. Cl.
*G06T 19/20* (2011.01)
*G06F 3/01* (2006.01)

(52) U.S. Cl.
CPC .............. *G06T 19/20* (2013.01); *G06F 3/017* (2013.01); *G06T 2200/24* (2013.01); *G06T 2210/12* (2013.01); *G06T 2210/32* (2013.01); *G06T 2210/56* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 10,614,633 | B2 * | 4/2020 | Schuneman | G06F 3/04815 |
| 11,846,981 | B2 * | 12/2023 | Dolev | G06F 9/451 |
| 12,296,262 | B2 * | 5/2025 | Shen | A63F 13/52 |
| 2023/0154213 | A1 * | 5/2023 | Gao | G06V 10/25 382/159 |
| 2023/0281824 | A1 * | 9/2023 | Mei | G06V 20/70 345/419 |
| 2023/0319221 | A1 * | 10/2023 | Doken | G06T 7/12 |
| 2023/0342890 | A1 * | 10/2023 | Kanazawa | G06T 11/20 |
| 2024/0046568 | A1 * | 2/2024 | Shreve | G06T 17/20 |
| 2024/0221308 | A1 * | 7/2024 | Kopp | G16H 30/40 |
| 2024/0331107 | A1 * | 10/2024 | Jerripothula | G06T 7/20 |
| 2025/0086922 | A1 * | 3/2025 | Acuna Marrero | G06V 10/82 |

* cited by examiner

*Primary Examiner* — Toan H Vu
(74) *Attorney, Agent, or Firm* — NDWE LLP

(57) ABSTRACT

Techniques for 3D point cloud labeling are described. An example of labeling includes initializing a point-cloud environment according to a configuration; loading of point-cloud data into a memory buffer of a device, wherein the point-cloud data is compatible with a virtual reality (VR) environment and a non-VR environment; drawing of at least the loaded point-cloud data into a point-cloud environment of the device; receiving user input in a task user interface of the device; and in response to the user input, performing an operation to one or more of a bounding box and quality of a label.

20 Claims, 18 Drawing Sheets
(8 of 18 Drawing Sheet(s) Filed in Color)

[1P] 1-Point Gesture

*A mid-air gesture that draws a cuboid by specifying a centroid in 3D space.*

1 Step. Index Finger.

3D POINT-CLOUD LABELING

BACKGROUND 3D point-cloud data is generated by automated sensing systems, such as Light Detection and Ranging (LiDAR), that provide a partially complete mapping of a physical environment and the objects within it. A point-cloud is a set of data points that describe the spatial locations of an environment's objects in 3D space. As automated sensing systems have become increasingly more common (such as in self-driving vehicles, robotics, etc.), the demand for software solutions that automatically detect objects within point-cloud data has grown exponentially. To build such software, large quantities of point-cloud data must be labeled by human annotators with bounded regions in 3D space (i.e., cuboids).

BRIEF DESCRIPTION OF DRAWINGS

The patent or application file contains at least one drawing executed in color. Copies of this patent or patent application publication with color drawing(s) will be provided by the Office upon request and payment of the necessary fee.

Various examples in accordance with the present disclosure will be described with reference to the drawings, in which.

DETAILED DESCRIPTION

The present disclosure relates to methods, apparatus, systems, and non-transitory computer-readable storage media for 3D point-cloud labeling in a virtual reality environment.

Today, methods and techniques for labeling 3D point-cloud data are both tedious and time-consuming. A deterrent to expediting the labeling process is tied to the satisfactory level of precision required for cuboid annotations. A conventional approach to labeling 3D point-cloud data is generally driven by 2D input devices (i.e., mouse and keyboard) that allow users to create, edit, and delete cuboid labels in the environment while simultaneously controlling the position and orientation of the user's current perspective. As point-cloud data often includes a large number of objects, the task of creating labels itself is significantly tedious. This is compounded by the notion that objects' individual point-cloud data are often within close proximity of one another, making it difficult to create labels that satisfy precision requirements between specific objects. Furthermore, point-cloud data collected in "real" environments involves a significant number of characteristics that amplify the challenging nature of the task with two-dimensional input devices, particularly in self-driving vehicle contexts (e.g., severe weather conditions, abnormal motion of traffic, unclear road conditions and complex urban traffic conditions). As current standards for deploying L4 and L5 autonomous vehicles require an accuracy of 99% or higher in order to be deployed, it can be assumed that such a standard cannot be efficiently met with the data labeling industry's current paradigm that relies on two-dimensional input devices.

Examples detailed here describe a point-cloud frame labeling service that enables users to label 3D point-cloud data that is rendered in a Virtual Reality (VR) interface. In some examples, a user uses a VR headset, along with "traditional" input mechanism such as a keyboard compatible with VR, to provide hand gesture-based interaction for point-cloud annotation. This will enable faster and higher quality annotations of point-cloud data.

In some examples, a provider network labeling service allows users with point-cloud data labeling needs to define a labeling job for point-cloud data and deploy the job to one or more virtual reality capable headset devices. In some examples, the point-cloud data is in a format that is supported by both VR and web browsers. In some examples, industry standard point-cloud data is converted to this format. In some examples, a user interface allows for one or more of the ability to: navigate 3D point-cloud data in first-person and third-person perspectives using VR-enabled web browsers; create, edit, and delete 3D cuboid annotations that contain subsets of the rendered point-cloud data; interact with the 3D point-cloud data using hand gestures (and, in some examples, in conjunction with other inputs); etc.

Figure 1:
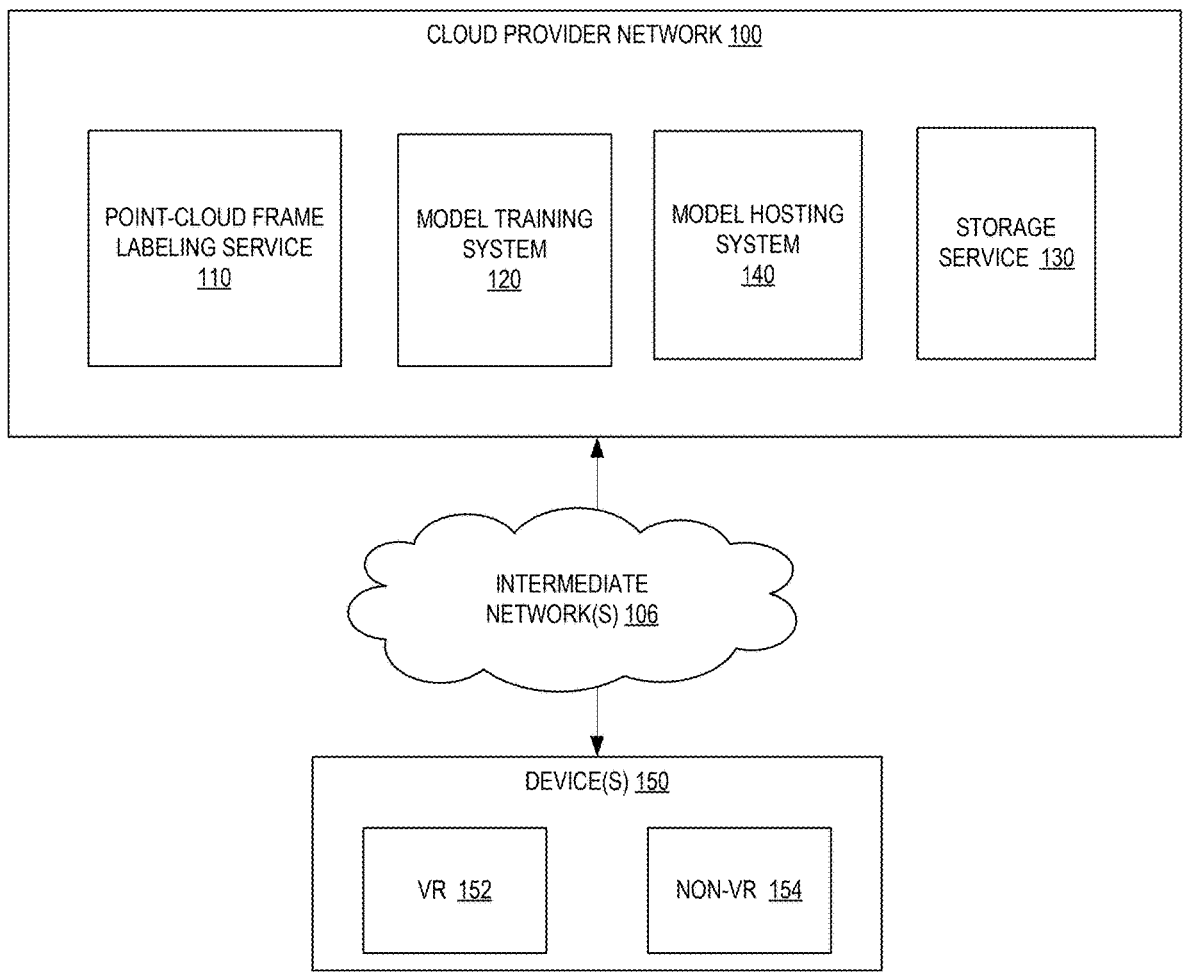
FIG. 1 illustrates examples of support for a point-cloud frame labeling service.

FIG. 1 illustrates examples of support for a point-cloud frame labeling service. A point-cloud frame labeling service 110 allows a user using a device 150 such as a VR headset 152 and/or non-VR hardware 154 to generate labels (e.g., in the form of bounding boxes) for point-cloud frame labeling, modify labels, and/or comment on labels. In some examples, the point-cloud frame labeling service 110 provides a user interface, rendering engine, etc. to a device 150 to allow for these acts. In other examples, the device 150 downloads these components elsewhere.

In some examples, the device 150 communicates with the point-cloud frame labeling service 110 via a model training system 120. For example, the point-cloud frame labeling service 110 invokes jobs on the model training system 120 that the device 150 communicates with via a user interface. In some examples, the device 150 hardware usage is minimal, and the user interface is streamed to the device 150 and hardware of the provider network 100 performs the heavy lifting of rendering the UI. In those examples, the hardware of the device 150 is used to track hand movement, etc. with the underlying calculations of bounding boxes, etc. being performed on the provider network 100.

The point-cloud frame labeling service 110 may utilize the storage service 130 to store point-data and/or labels.

The labeled point-cloud data may be used to train a model with the model training system 120 to be hosted by the model hosting system 140.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity-such as the provider network itself-that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

Figure 2:
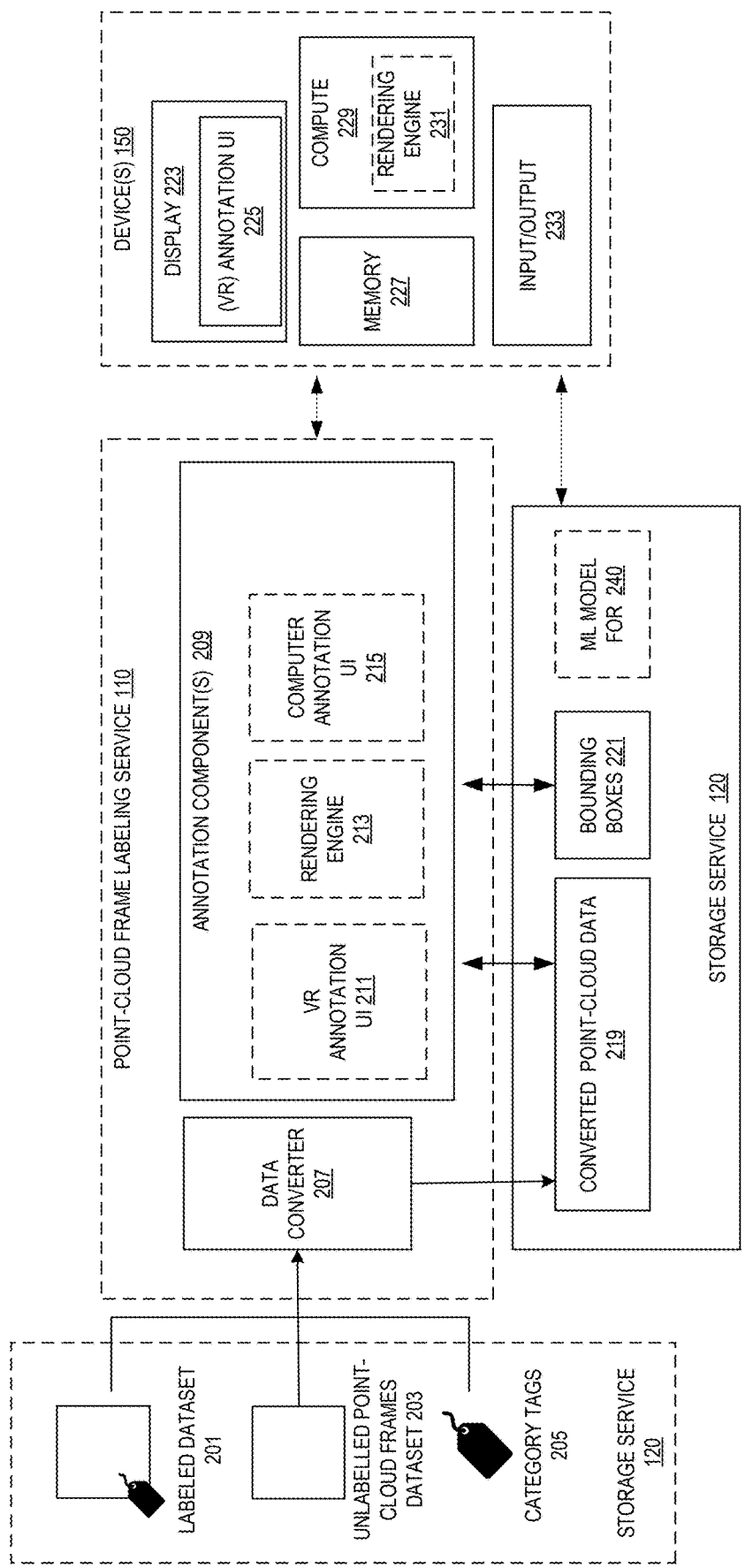
FIG. 2 illustrates examples of an architecture for point-cloud labeling.

FIG. 2 illustrates examples of an architecture for point-cloud labeling. In this illustration, a point-cloud frame labeling service 110 interacts with a storage service 130 and one or more VR device(s) 150 to label cloud-point frames and/or mark a label's quality. The architecture includes activities to be able to label cloud-point frames and/or mark a label's quality.

In some examples, the point-cloud frame labeling service 110 is to be configured to execute one or more jobs to label cloud-point frames and/or mark a label's quality. For example, a user provides unlabeled data of point-cloud sequential frames 203 and list a of categories (tags) 205 for labels that are to be stored using a storage service 130.

The user may also define a task (e.g., what data type the unlabeled data is in, where data is stored and is to be stored, what compute resources are to be used for point-cloud frame labeling jobs, etc.), provide specific instructions on labeling to be presented to a labeler, define a quality of labels required (for later review), and/or provide samples of annotation (for later review and/or to be presented to a labeler as an example). Alongside the unlabeled data, a user can also provide a sample of labeled data 201 ("known" answers will be used as referential points of comparison for accuracy) for qualitative metrics evaluation.

Once configured, the point-cloud labeling service 110 uses a data converter 207 to translate point-cloud data (e.g., the labeled dataset 201 and/or unlabeled data 203) into a 2D/3D format that is compatible both with desktop browsers (e.g., that can render a standard web application that renders a 3D environment on a 2D screen) and with VR-based browsers (e.g., that are designed to render 3D assets natively). For example, PLY files are translated into the 2D/3D format. The data converter 207 may also be used to convert back to the original format. The conversion restructures existing data while ensuring that the data's format will be suitable for consumption by all relevant rendering engines in the two aforementioned browser types. After the conversion process is complete, the converted data 219 is stored in a defined (e.g., user defined) location in the storage service 120 which can be accessed by all browser clients.

An existing point-cloud format is called the Polygon File Format (PLY). This format includes an element keyword that describes how data elements are stored and how many there are (e.g., "element vertex 3" would indicate a data element as 3 vertices) and properties for elements (e.g., x, z, and z, color, etc. information).

The 2D/3D format that is compatible both with desktop browsers and VR-based browsers utilizes an ASCII representation to store and load point cloud data. The file structure of this format (sometimes called VRPLY) and includes one or more of a header, coordinate system information, VR headset transform and origin information, and/or a 3D point cloud vertex list.

In some examples, the header contains metadata about the contents of the file. The header may begin with the first line that features the characters 'vrply,' signifying the file format type. Following this is the ASCII representation and format version number.

In various 3D environments, different coordinate systems are employed. These can include the right-hand coordinate system where the Z-axis signifies the 'Up' direction or the left-hand coordinate system with the Y-axis indicating the 'Up' direction. In some examples, the coordinate system information contains this formation. For example, a "coordinate_system" element provides this information. For example, "element coordinate_system 1" indicates the element and lines following the "element" keyword detail the properties of the X, Y, and Z axes. These axis properties may be represented as signed integers, with '1' designating the 'Up' direction axis.

To ensure that the VR device position aligns with the rendered 3D point clouds within the same coordinate system, an initial position of the VR device is obtained. This position is updated for each frame, after instantiation, based on the degrees of freedom sensor data obtained from the headset. This information is denoted by a 'vr_origin' element in some examples. For the initiation position of the VR headset, in some examples a total of 9 floating-point values are used (e.g., x, y, z, yaw, pitch, roll, scalex, scale-y, and scale-z). The first three represent the x, y, and z coordinate information. The subsequent three floating-point values represent the Euler angles that define the headset's rotation with respect to the point cloud. The final set of floating-point values represents the scaling factor.

A VRPLY file contains vertex information indicating precise point locations. Unlike a standard PLY file, a VRPLY file may lack any face representation since it solely focuses on point data, eliminating the need for face information. However, in contrast to a standard PLY file, each point origin in VRPLY includes an additional Boolean variable at its end. This Boolean variable indicates whether the point is part of a prior annotation. This information is used by a graphic shader in determining an appropriate color for shading each point.

With the point-cloud data ready, one or more annotation components 209 may be invoked to process user annotations made with one or more device(s) 150. The VR annotation UI 211 will be provided to a VR device, a rendering engine 213 will be provided to a VR device or other device (e.g., a desktop browser), and a computer UI 215 will be provided to a non-VR computer. The UIs are supported by underlying software to accept user input, cause a rendering, etc.

In some examples, the one or more device(s) 150 include VR device having a display 223, a VR annotation user interface (UI) 225 running on the display, memory 227, compute hardware 229 (e.g., a central processing unit, a graphics processing unit, and/or an accelerator), a rendering engine 231 (note this is between hardware components in some examples), and/or input/output mechanisms 233 (e.g., a VR compatible mouse and/or keyboard). In some examples, the one or more device(s) 150 include non-VR device having a display 223, a 2D annotation user interface (UI) 225 running on the display, memory 227, compute hardware 229 (e.g., a central processing unit, a graphics processing unit, and/or an accelerator), a rendering engine 231 (note this is between hardware components in some examples), and/or input/output mechanisms 233 (e.g., a mouse and/or keyboard). In some examples, position and orientation data from the VR device, as well as hand tracking information, are collected through an application programming interface (API) of the VR device and transmitted to a 3D software interface.

In some examples, a user uses a first hand to manipulate data points (e.g., using captured hand gestures) and/or bounding boxes and second hand to delimit (e.g., select or confirm an action). In some examples, delimiting is performed using a keyboard or mouse.

In some examples, the point-cloud frame labeling service 110 launches labeling jobs on model training system 120 in which users that have access to the deployed job can access from a browser or VR headset's browser. Upon the start of the job, a browser will make a request for a task interface to be served. All relevant front-end assets will be served to the user's browser that are relevant to using the (VR) Annotation UI for a given task.

In some examples, when existing assets have loaded, the UI initiates an initialization procedure that includes one or more of: (1) loading the point-cloud data, (2) validating the format of the provided point-cloud data, (3) rendering the point-cloud data environment with the system's rendering engine, (4) initializing the state of the user's position in the environment, and/or (5) initializing the virtual reality environment's interface with a configuration file that describes how the task, interaction, and environment are collectively configured (e.g., color of the point-cloud data, etc.).

Figure 3:
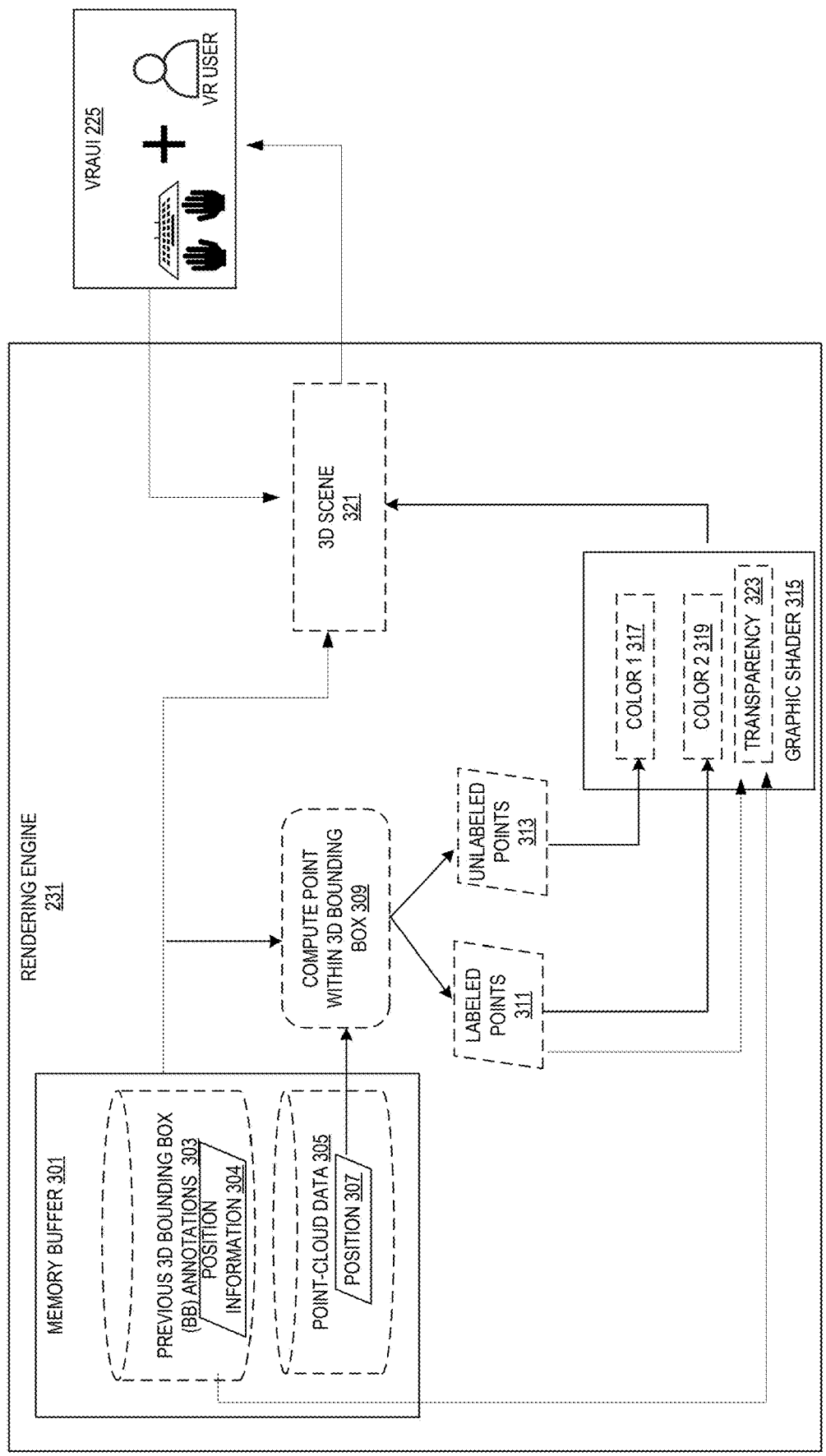
FIG. 3 illustrates examples of a rendering engine.

FIG. 3 illustrates examples of a rendering engine. In some examples, a deployed rendering engine (e.g., rendering engine 231) renders a (3D) canvas that contains graphical elements such as environmental objects, 3D cuboid annotations, etc. that can be seen by the user. In some examples, the rendering engine causes converted point-cloud data 219 and/or existing bounding boxes 221 to be loaded into a memory buffer 301 (shown as point-cloud data 305 and previous 3D bounding box (BB) annotations 303 respectively). In some examples, the faces of a BB are associated with a transparency value (for example, 0 being transparent and 1 being opaque. In some examples, the edges of a bounding box have a transparency value of 1. In some examples, edges of boxes have an red, green, and blue (RGB) value and transparency value.

The rendering engine 231 draws the point-cloud data 305 into the point-cloud environment. For a given position point-cloud data position 307, the rendering engine 231 determines if that point is within an existing BB at 309. Labeled points 311 within a BB are given a color (e.g., color 2 319) that is different than unlabeled points 313 (e.g., those have color 2 317).

The BB 303 and point-cloud data points 305 are rendered in a 3D scene 321 that is visible in the VR annotation UI 225. The 3D scene 31 may also include 3D cuboid annotation previews for any annotation that is in the process of being drawn. Accordingly, the 3D scene 321 comprises drawn 3D cuboid annotations that already exist on the canvas, point-cloud data, and/or 3D cuboid annotation previews.

In some examples, to allow the user task interface to rapidly re-draw densely populated scenes, a graphics shader 315 is used to efficiently render large numbers of point-cloud data spheres in the point-cloud environment. In some examples, the graphics shader 315 is executed on a GPU while one or more of the other operations are performed on a CPU.

With the task interface (the UI) initialized, it can be used to annotate point-cloud data and navigate within the point-cloud data. In some examples, hands-free gestures (with optional other input assistance) are used as input. In some examples, the task interface renders the provided point-cloud from a birds-eye view (i.e., that allows users to look-down at the point-cloud data from a 45 degree angle). From this angle, the environment allows the user to easily zoom-in and -out using a set of two-handed gestures or keyboard interactions. The interface facilitates directed movement, panning, and rotation within the miniature environment by allowing users to blend these gestures with keyboard interaction to create an interaction design. The system's hands-free interaction paradigm is powered by a subroutine procedure that first identifies the position of a user's hands with the VR headset's native sensors and second examines the position, orientation, and shape of the user's fingers to determine whether a specific gesture is being performed.

Figure 4:
FIG. 4 illustrates examples of the interface while it is drawing a preview of the 3D cuboid being drawn while a bounding box generation (BB) gesture is being performed.

FIG. 4 illustrates examples of the interface while it is drawing a preview of the 3D cuboid being drawn while a BB generation gesture is being performed. As shown, the fingertips are identified and their position, orientation, and shape is used to draw a BB. In some examples, the interface allows users to express their intent to create a 3D cuboid annotation by positioning a hand in a C-like shape in the point-cloud data environment. An event listener examines the vector projection between the tip of the thumb and index finger (represented with spheres in FIG. 4) to anchor a preview of the white, translucent 3D cuboid that scales the length of the projection. All points that lie within the previewed cuboid annotation are highlighted in a different color to indicate their selection or inclusion. In some examples, the system allows the user to express their intent to anchor the 3D cuboid annotation in the environment by pressing a predetermined key on the physical keyboard attached to the system.

Figure 5:
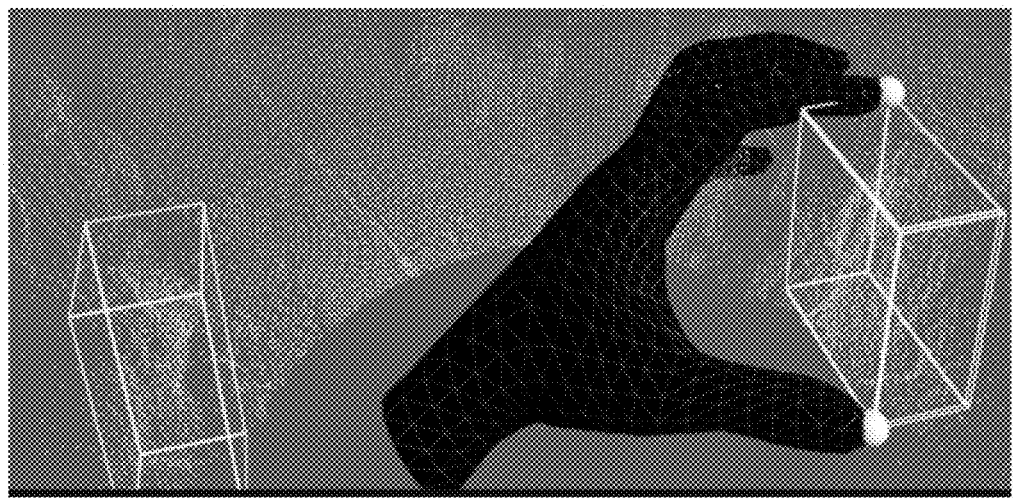
FIG. 5 illustrates examples of the interface while it is drawing a preview of the 3D cuboid being drawn while a BB generation gesture is being performed.

FIG. 5 illustrates examples of the interface while it is drawing a preview of the 3D cuboid being drawn while a BB generation gesture is being performed. This figure is different than FIG. 4 as there is already an existing BB shown on the left while the hand capturing.

In some examples, the interface allows users to make modifications to a previously created 3D cuboid annotation with a pinch gesture at one of the vertices of the cuboid. Each cuboid annotation contains a spherical collider in each of its vertices. A pinch gesture is detected when the tip of the index finger and the tip of the thumb collide with each other in a given frame. When a pinch gesture is detected within one of the spherical colliders the cuboid enters an edit mode. Within the edit mode the user can drag the edge of the cuboid and make modifications to its size. The user can exit the edit mode with another pinch gesture. Pinching the edge will only allow the users to modify the size (length, width, or height) of the cube in some examples.

In some examples, the interface allows users to move the position of created 3D cuboid annotation with a pinch gesture at the center of the cuboid. Each cuboid contains a spherical collider around its center. The size of the spherical collider is determined based on the size of the cuboid with the diameter of the collider equal to the size of the smallest edge. When a pinch gesture is detected in the spherical collider at the center, the user will enter the position modifying mode, where the user can move the cuboid to any other position. The user can exit the mode with a second pinch gesture upon reaching the desired location in 3D space.

In some examples, a user can delete a previously created 3D cuboid annotation in the interface with a double pinch gesture within the cuboid. A double pinch gesture is detected when the event listener detects two pinch gestures successively in subsequent frames. The pinches are detected by the same central spherical collider used to detect position modification mode.

Figure 6:
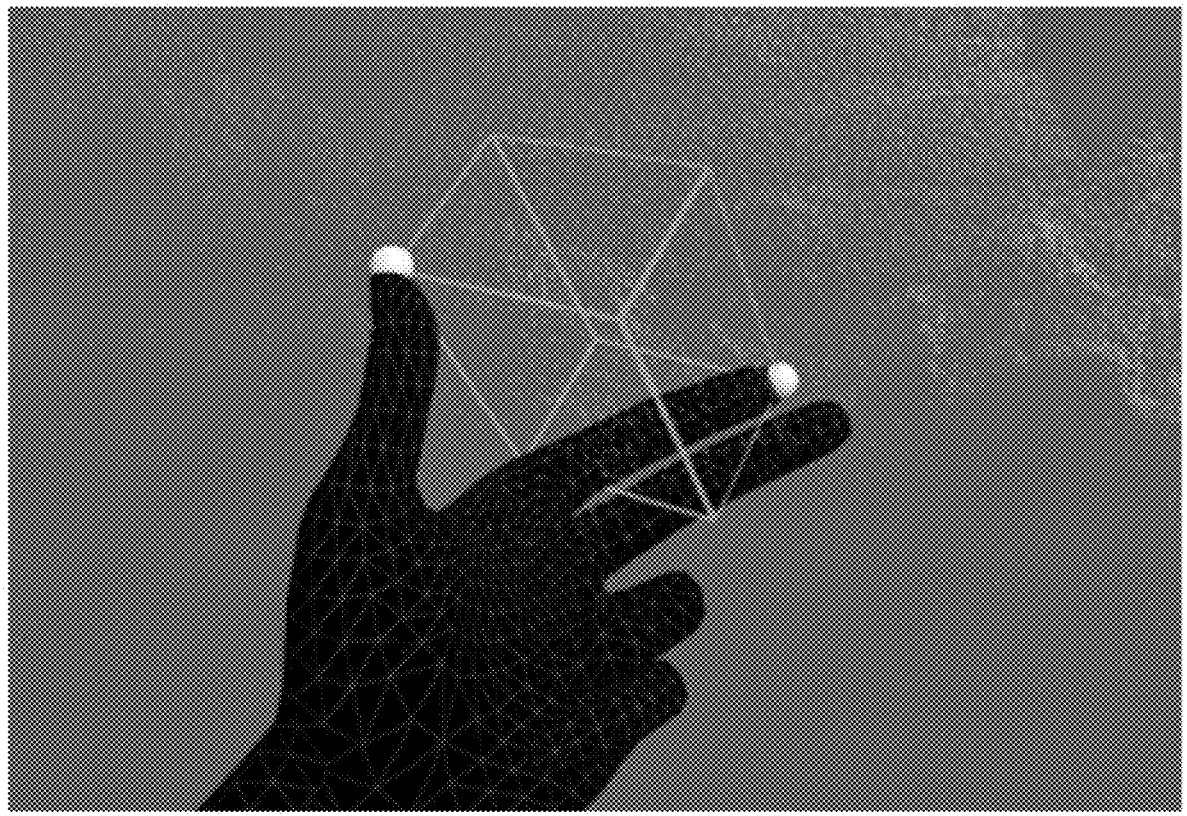
FIGS. 6 and 7 illustrates examples of requesting feedback via hand gestures.
Figure 7:
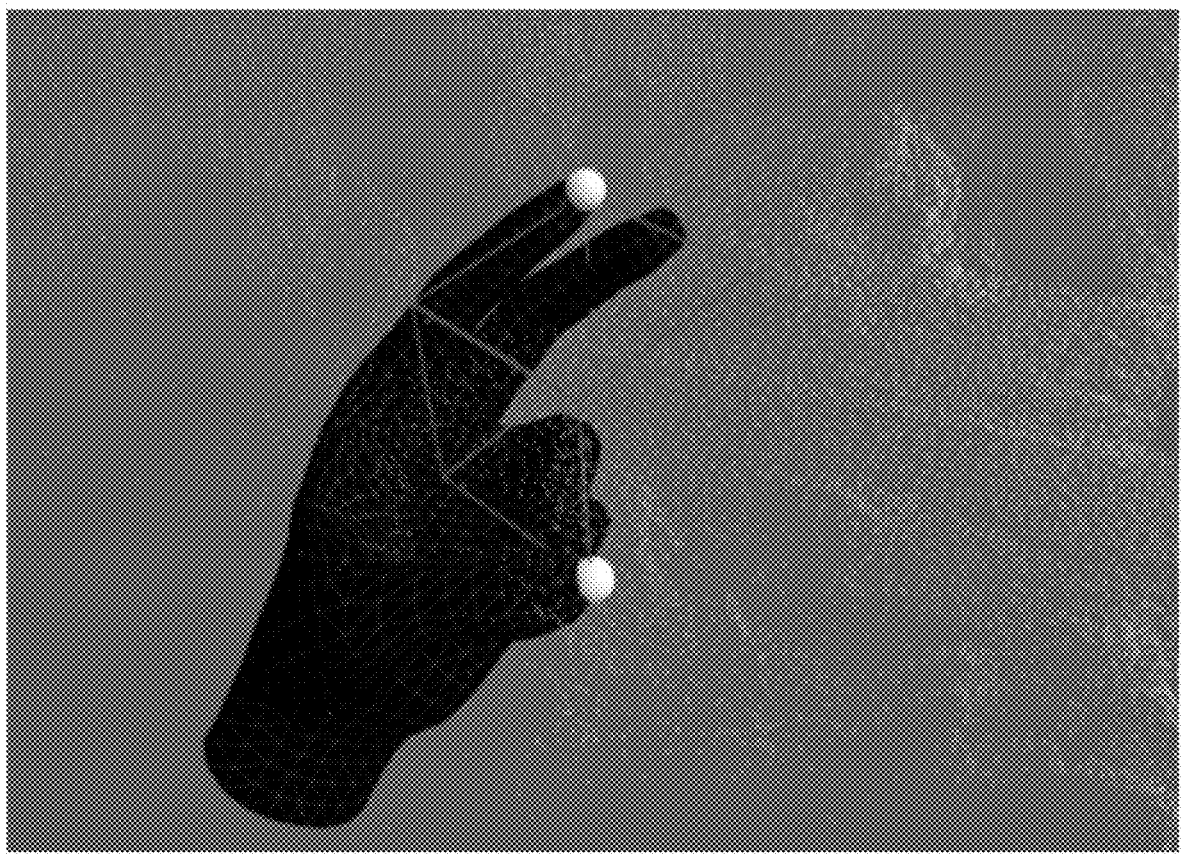

In some examples, the interface allows users to express an interest in receiving feedback about the correctness of their 3D cuboid annotation's position that is currently being drawn. Real-time feedback can be requested and invoked by extending an additional finger. FIGS. 6 and 7 illustrates examples of requesting feedback via hand gestures. As shown, the middle finger is extended which causes the interface to provide feedback by updating the visual border of the drawn box. If the drawn box is believed to be incorrect, the box will be colored a certain color (e.g., red as shown in FIG. 6). Otherwise, the box will be colored green as shown in FIG. 7. As the interface's rendering engine redraws the 3D canvas at sub-second time, feedback can be provided near instantaneously.

In some examples, the interface's feedback functionality is based on the availability of 3D cuboid annotation data that is source from ground-truth data (labeled data 201) or from a machine learning model performing real-time inference. If such a source of information is available, the interface will compute the intersection over union (IoU) between the box being drawn and the 3D cuboid annotations that are sourced from the ground-truth or a machine learning model. The interface may use a user-provided threshold for quality to determine if a cuboid annotation should be classified as "good" or "bad."

In some examples, a log of when assistance is used is stored. This log may be provided to label (BB) reviews and may indicate difficulty in the annotation of a particular label or lack of confidence from the annotator with the label created.

After a labeling, the annotations are reviewed for quality and correctness in some examples. Annotation reviewers can evaluate the labels with the VR UI or a desktop UI. The reviewer can check the quality of annotation and determine acceptance or failure of the labels. Failed labels can either be re-labeled directly by the reviewer or be sent back for another round of annotation. Accepted labels are collected and stored. In some examples, special emphasis is placed on labels that were created with a three finger gesture instead of the two finger gesture form the annotators as these annotations indicate the user faced difficulty during annotation task and required system assistance for evaluation.

In some examples, a hand gesture input is a "size gesture" that utilizes the positions of the index fingertip and thumb tip of the gestural hand such as those detailed above. A vectorial distance between these two points is calculated in real-time, serving as the volumetric diagonal for rendering a 3D cuboid.

Figure 8:
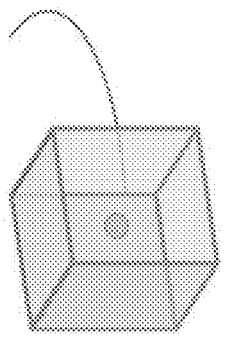
FIG. 8 illustrates examples of one-point gesture bounding box creation.
Figure 8:
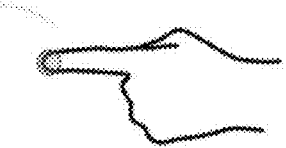

In some examples, a one-point gesture is utilized. An initiated bounding box's location is set at a local position of a particular fingertip (e.g., index finger) that serves as the centroid of the bounding box. Note that the bounding box will have a default or selected size. Users can later edit the annotation for size, position, and orientation. FIG. 8 illustrates examples of one-point gesture bounding box creation.

Figure 9:
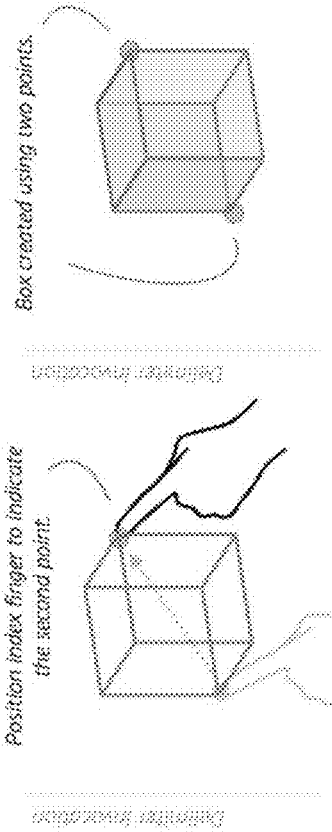
FIG. 9 illustrates examples of two-point gesture bounding box creation.

In some examples, a two-point gesture is utilized. This gesture involves a two-step trigger process. First, a trigger sequence is used to obtain the initial position information and then a second trigger captures the end position. The vectorial distance between these two positions is computed, resulting in the rendering of a cuboid annotation. In some examples, a trigger is an act with a finger. In some examples, a trigger is a keyboard or mouse input. FIG. 9 illustrates examples of two-point gesture bounding box creation.

Figure 10:
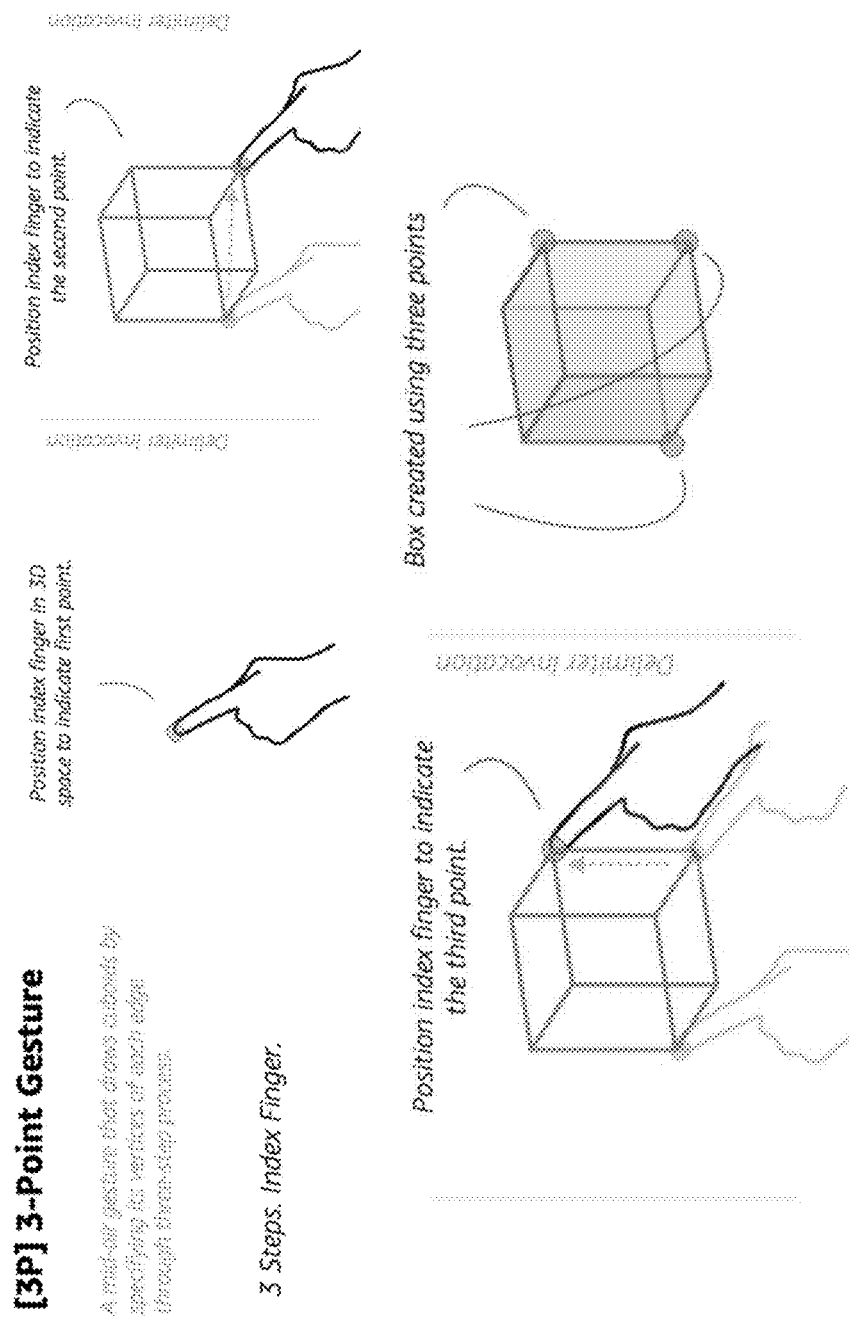
FIG. 10 illustrates examples of three-point gesture bounding box creation.

In some examples, a three-point gesture is utilized and requires three triggers. A finger tip is placed at three positions to set each of the dimensions of the cuboid with a trigger being made at each position. FIG. 10 illustrates examples of three-point gesture bounding box creation. In some examples, a trigger is an act with a finger. In some examples, a trigger is a keyboard or mouse input.

In some examples, an update to a bounding box is made using an edit widget that allows a user to perform scaling, reorientation, and/or repositioning.

Figure 11:
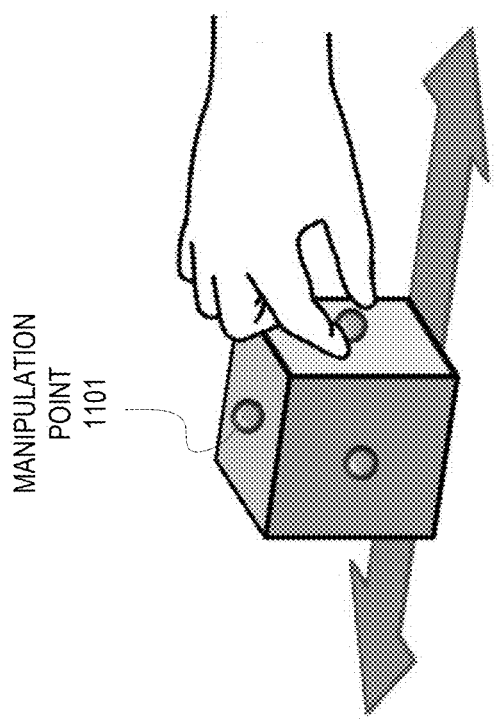
FIG. 11 illustrates examples of scaling of a BB.
Figure 12:
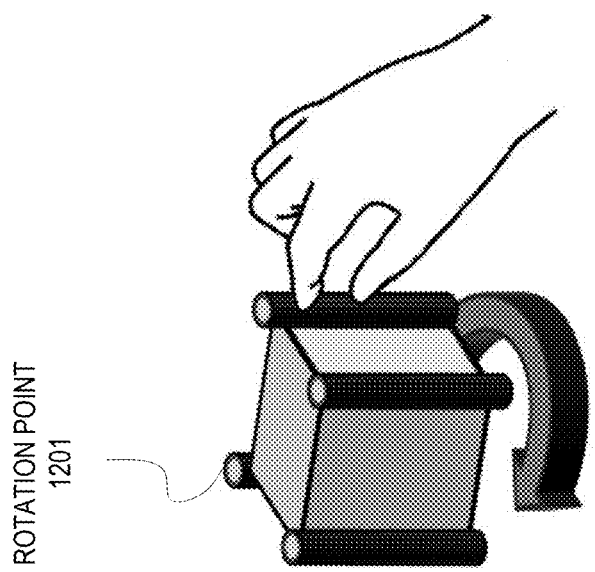
FIG. 12 illustrates examples of rotation of a BB.

FIG. 11 illustrates examples of scaling of a BB. In some examples, a manipulation point 1101 is placed on each face of an annotation. An annotation may be scaled by pinching and pulling or pushing one of the manipulation points. FIG. 12 illustrates examples of rotation of a BB. In some examples, a manipulation mechanism such as rotational points 1201 (e.g., cylinders) attached to the edges of the annotations) is generated on at least some edges of a BB. To change the orientation of the box users can grab a rotation point and rotate it to a desired position.

Figure 13:
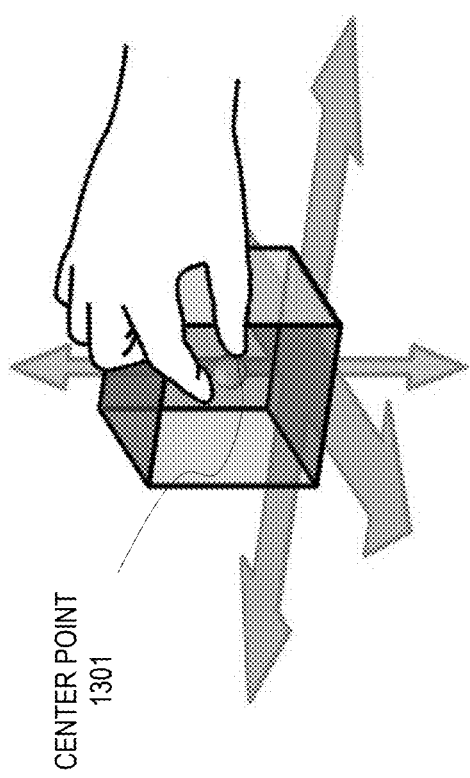
FIG. 13 illustrates examples of relocation of a BB.

FIG. 13 illustrates examples of relocation of a BB. In some examples, a manipulation mechanism such as center point 130 is placed in the center of a BB. To change a location of the box, a user can use the center point to position the BB to a desired location.

Figure 14:
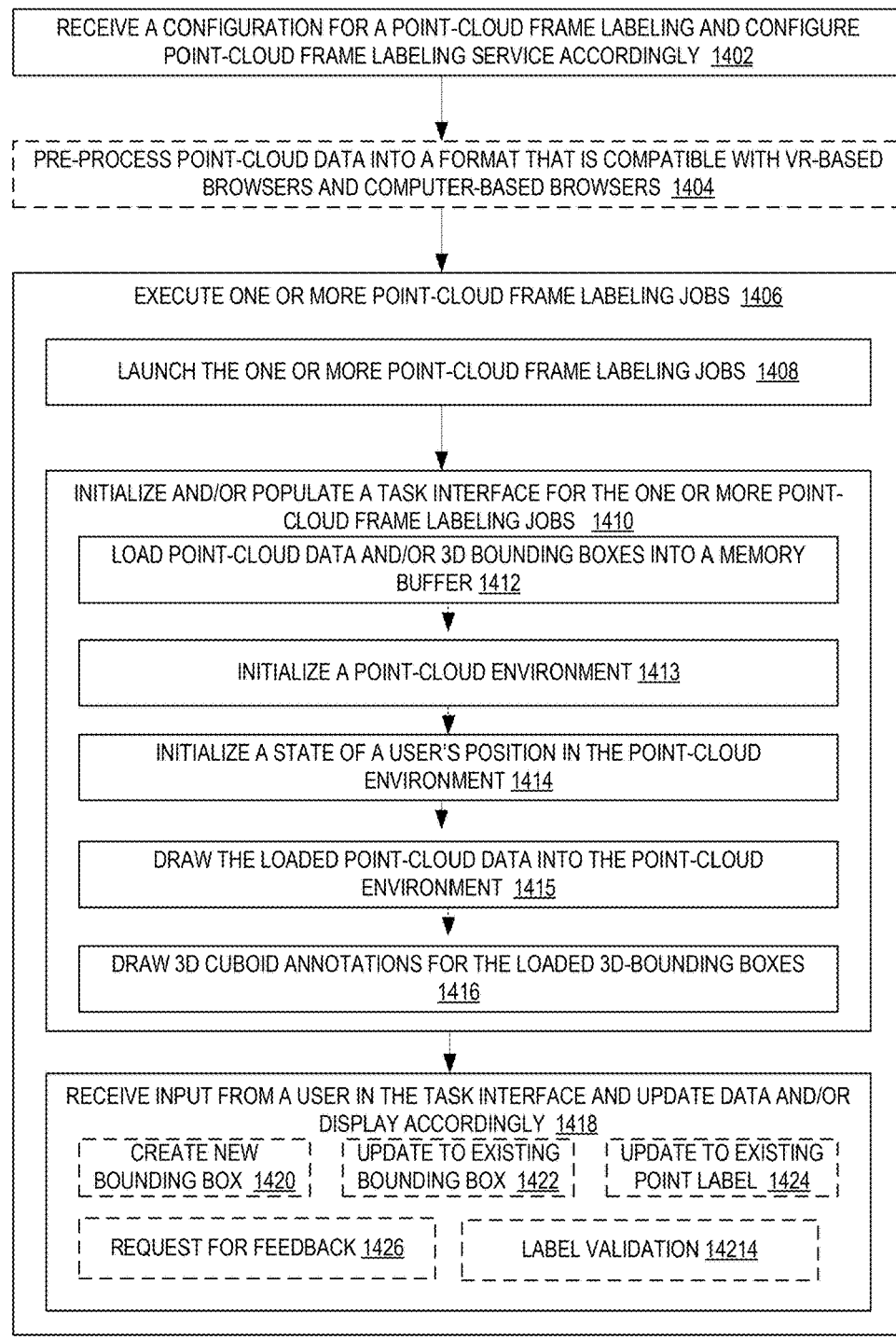
FIG. 14 is a flow diagram illustrating operations of a method for 3D point-cloud labeling according to some examples.

FIG. 14 is a flow diagram illustrating operations of a method for 3D point-cloud labeling according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the point-cloud frame labeling service 110 and/or device(s) 150 of the other figures.

A configuration for a point-cloud frame labeling is received and the point-cloud frame labeling service is configured accordingly at 1402. In some examples, the configuration file describes how the task (e.g., labeling and/or review), UI, and environment are collectively to be configured (e.g., color of the point-cloud data, etc.) by the labeling service. This may include indicating where data (BBs, unlabeled data, etc.) are stored, where to store new BBs, who can access the task, what hardware is supported, etc.

In some examples, point-cloud data is pre-processed (converted) into a format that is compatible with both VR-based browsers and computer-based browsers at 1404. Note that this conversion may not need to happen if the point-cloud data is in the correct format already.

One or more point-cloud frame labeling jobs are executed at 1406. In some examples, the jobs are executed on a model training service in conjunction with VR or non-VR hardware.

One or more point-cloud frame labeling jobs are launched at 1408. This launching causes the task interface to be made available to users via an annotation task interface. The task interface may include an indication of the task to perform (e.g., labeling or validating).

An annotation task interface for the one or more point-cloud frame labeling jobs is initialized and/or populated at 1410. In some examples, the interface is streamed to VR or non-VR user hardware. In some examples, a user interface is initialized on those devices.

In some examples, point-cloud data and existing 3D bounding boxes are loaded into a memory buffer at 1412. For example, they are loaded into a memory buffer of a VR headset. In some examples, a validation is also performed. The validation may include determining if the data is in the proper format. If not, the pre-processing act may be called. Note the service 110 or device hardware 150 may do the validation.

A point-cloud environment is initialized at 1413. For example, the environment is set up for a user's use according to the configuration. The state of a user's position in the point-cloud environment is initialized at 1414. For example, a default starting location within the environment is set.

The loaded point-cloud data is drawn into the point-cloud environment at 1415. In some examples, a GPU does this drawing. In some examples, existing 3D cuboid annotations for the loaded 3d-bounding boxes are drawn at 1416. In some examples, a CPU does this drawing.

With the task interface ready, input from a user is received in the task interface and data and/or the display are updated accordingly at 1418. Several different kinds of input and updates may be received.

In some examples, a user uses hand gestures to create a new bounding box at 1420. The user's hand gestures are captured, and the 3D box rendered. In some examples, the point-cloud data in the box is updated to a color that is different than a non-labeled data color.

In some examples, a user uses hand gestures to update an existing bounding box at 1422. The user's hand gestures are captured, and the updated 3D box rendered. In some examples, the point-cloud data in the box is updated to a color that is different than a non-labeled data color.

In some examples, a user uses hand gestures to update an individual label for a point at 1424. The user's hand gestures are captured (e.g., a selection of a point and removing it from a box or into a box) and the updated 3D box rendered. The point-cloud data in the box is updated to reflect its labeled or unlabeled status.

In some examples, a user uses hand gestures to request feedback at 1426. The user's hand gestures are captured, and the updated 3D box rendered to reflect a determination of "good" versus "bad." In some examples, the 3D box is marked as requiring assistance.

In some examples, a user uses hand gestures or traditional means (keyboard and/or mouse) to provide label validation at 1428. When hand gestures are used, the user's hand gestures are captured (e.g., a selection of a point and removing it from a box or into a box) and the updated 3D box rendered. The point-cloud data in the box is updated to reflect its labeled or unlabeled status.

Note that for any of the above inputs the underlying data may change, and the changes stored. In some examples, the changes are pushed to a storage service 130.

Figure 15:
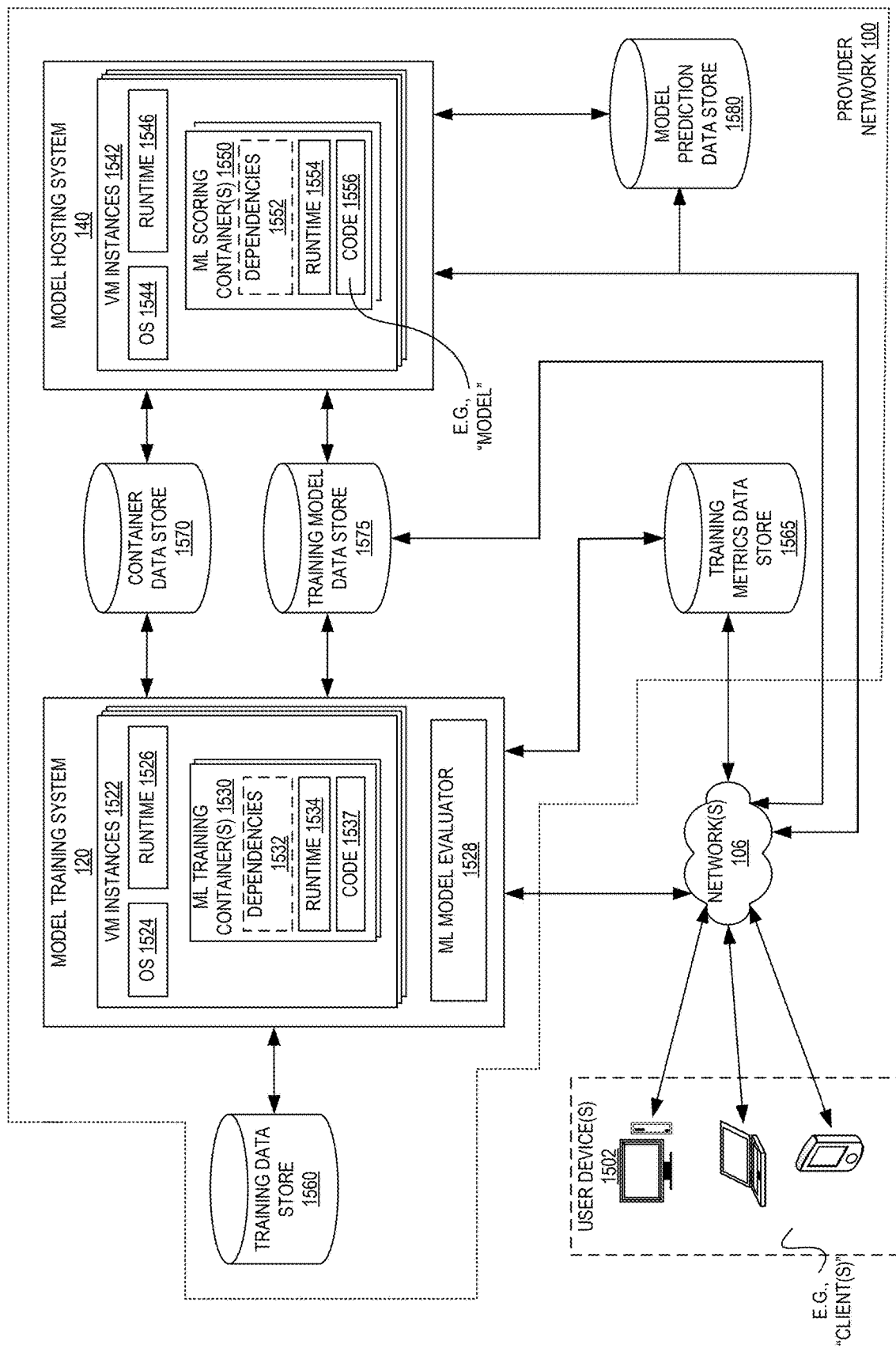
FIG. 15 is a block diagram of an illustrative operating environment in which machine learning models are trained and hosted according to some embodiments.

FIG. 15 is a block diagram of an illustrative operating environment in which machine learning models are trained and hosted according to some embodiments. The operating environment includes end user devices 1502 (for example, computing devices(s), edge device(s)), a model training system, a model hosting system, a training data store 1560, a training metrics data store 1565, a container data store 1570, a training model data store 1575, and a model prediction data store 1580.

A machine learning service described herein may include one or more of these entities, such as the model hosting system 140, model training system 120, and so forth.

In some embodiments, users, by way of user devices 1502, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 1502 and the model training system 120 (or provider network 100), and/or between components of the model training system 120 (or provider network 100), can use HTTP messages to transfer data in a machine-readable file format, such as extensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 1502 can interact with the model training system 120 via frontend 1529 of the model training system 120. For example, a user device 1502 can provide a training request to the frontend 1529 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 1502, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 1502 may provide, in the training request, an algorithm written in any programming language. The model training system 120 then packages the algorithm into a container (optionally with other code, such as a "base" ML algorithm supplemented with user-provided code) that is eventually loaded into a virtual machine instance 1522 for training a machine learning model, as described in greater detail below. For example, a user, via a user device 1502, may develop an algorithm/code using an application (for example, an interactive web-based programming environment) and cause the algorithm/code to be provided-perhaps as part of a training request (or referenced in a training request)-to the model training system 120, where this algorithm/code may be containerized on its own or used together with an existing container having a machine learning framework, for example.

In some embodiments, instead of providing a container image in the training request, the user device 1502 provides, in the training request, an indicator of a container image (for example, an indication of an address or a location at which a container image is stored). For example, the container image can be stored in a container data store 1570, and this container image may have been previously created/uploaded by the user. The model training system 120 can retrieve the container image from the indicated location and create a container using the retrieved container image. The container is then loaded into a virtual machine instance 1522 for training a machine learning model, as described in greater detail below.

The model training system 120 can use the information provided by the user device 1502 to train a machine learning model in one or more pre-established virtual machine instances 1522 in some embodiments. In particular, the model training system 120 includes a single physical computing device or multiple physical computing devices that are interconnected using one or more computing networks (not shown), where the physical computing device(s) host one or more virtual machine instances 1522. The model training system 120 can handle the acquisition and configuration of compute capacity (for example, containers, instances, etc., which are described in greater detail below) based on the information describing the computing machine on which to train a machine learning model provided by the user device 1502. The model training system 120 can then train machine learning models using the compute capacity, as is described in greater detail below. The model training system 120 can automatically scale up and down based on the volume of training requests received from user devices 1502 via frontend 1529, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 1522 are used to execute tasks. For example, such tasks can include training a machine learning model. As shown in FIG. 15, each virtual machine instance 1522 includes an operating system (OS) 1524, a language runtime 1526, and one or more ML training containers 1530. Generally, the ML training containers 1530 are logical units created within a virtual machine instance using the resources available on that instance and can be used to isolate execution of a task from other processes (for example, task executions) occurring in the instance. In some embodiments, the ML training containers 1530 are formed from one or more container images and a top container layer. Each container image may further include one or more image layers, where each image layer represents an executable instruction. As described above, some or all of the executable instructions together represent an algorithm that defines a machine learning model. Changes made to the ML training containers 1530 (for example, creation of new files, modification of existing files, deletion of files, etc.) are stored in the top container layer. If a ML training container 1530 is deleted, the top container layer is also deleted. However, the container image(s) that form a portion of the deleted ML training container 1530 can remain unchanged. The ML training containers 1530 can be implemented, for example, as Linux containers (LXC), Docker containers, and the like.

The ML training containers 1530 may include individual a runtime 1534, code 1537, and dependencies 1532 needed by the code 1537 in some embodiments. The runtime 1534 can be defined by one or more executable instructions that form at least a portion of a container image that is used to form the ML training container 1530 (for example, the executable instruction(s) in the container image that define the operating system and/or runtime to run in the container formed from the container image). The code 1537 includes one or more executable instructions that form at least a portion of a container image that is used to form the ML training container 1530. For example, the code 1537 includes the executable instructions in the container image that represent an algorithm that defines a machine learning model, which may reference (or use) code or libraries from dependencies 1532. The runtime 1534 is configured to execute the code 1537 in response to an instruction to begin machine learning model training. Execution of the code 1537 results in the generation of model data, as described in greater detail below.

In some embodiments, the code 1537 includes executable instructions that represent algorithms that define different machine learning models. For example, the code 1537 includes one set of executable instructions that represent a first algorithm that defines a first machine learning model and a second set of executable instructions that represent a second algorithm that defines a second machine learning model. In some embodiments, the virtual machine instance 1522 executes the code 1537 and trains all of the machine learning models. In some embodiments, the virtual machine instance 1522 executes the code 1537, selecting one of the machine learning models to train. For example, the virtual machine instance 1522 can identify a type of training data indicated by the training request and select a machine learning model to train (for example, execute the executable instructions that represent an algorithm that defines the selected machine learning model) that corresponds with the identified type of training data.

In some embodiments, the runtime 1534 is the same as the runtime 1526 used by the virtual machine instance 1522. In some embodiments, the runtime 1534 is different than the runtime 1526 used by the virtual machine instance 1522.

In some embodiments, the model training system 120 uses one or more container images included in a training request (or a container image retrieved from the container data store 1570 in response to a received training request) to create and initialize a ML training container 1530 in a virtual machine instance 1522. For example, the model training system 120 creates a ML training container 1530 that includes the container image(s) and/or a top container layer.

Prior to beginning the training process, in some embodiments, the model training system 120 retrieves training data from the location indicated in the training request. For example, the location indicated in the training request can be a location in the training data store 1560. Thus, the model training system 120 retrieves the training data from the indicated location in the training data store 1560. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 1522 training the machine learning model. Once the virtual machine instance 1522 has applied and used the retrieved portion or once the virtual machine instance 1522 is about to use all of the retrieved portion (for example, a buffer storing the retrieved portion is nearly empty), then the model training system 120 can retrieve a second portion of the training data and provide the second retrieved portion to the virtual machine instance 1522, and so on.

To perform the machine learning model training, the virtual machine instance 1522 executes code 1537 stored in the ML training container 1530 in some embodiments. For example, the code 1537 includes some or all of the executable instructions that form the container image of the ML training container 1530 initialized therein. Thus, the virtual machine instance 1522 executes some or all of the executable instructions that form the container image of the ML training container 1530 initialized therein to train a machine learning model. The virtual machine instance 1522 executes some or all of the executable instructions according to the hyperparameter values included in the training request. As an illustrative example, the virtual machine instance 1522 trains a machine learning model by identifying values for certain parameters (for example, coefficients, weights, centroids, etc.). The identified values depend on hyperparameters that define how the training is performed. Thus, the virtual machine instance 1522 can execute the executable instructions to initiate a machine learning model training process, where the training process is run using the hyperparameter values included in the training request. Execution of the executable instructions can include the virtual machine instance 1522 applying the training data retrieved by the model training system 120 as input parameters to some or all of the instructions being executed.

In some embodiments, executing the executable instructions causes the virtual machine instance 1522 (for example, the ML training container 1530) to generate model data. For example, the ML training container 1530 generates model data and stores the model data in a file system of the ML training container 1530. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 1530 such that the model data is written to the top container layer of the ML training container 1530 and/or the container image(s) that forms a portion of the ML training container 1530 is modified to include the model data.

The virtual machine instance 1522 (or the model training system 120 itself) pulls the generated model data from the ML training container 1530 and stores the generated model data in the training model data store 1575 in an entry associated with the virtual machine instance 1522 and/or the machine learning model being trained. In some embodiments, the virtual machine instance 1522 generates a single file that includes model data and stores the single file in the training model data store 1575. In some embodiments, the virtual machine instance 1522 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 1522 can package the multiple files into a single file once training is complete and store the single file in the training model data store 1575. Alternatively, the virtual machine instance 1522 stores the multiple files in the training model data store 1575. The virtual machine instance 1522 stores the file(s) in the training model data store 1575 while the training process is ongoing and/or after the training process is complete.

In some embodiments, the virtual machine instance 1522 regularly stores model data file(s) in the training model data store 1575 as the training process is ongoing. Thus, model data file(s) can be stored in the training model data store 1575 at different times during the training process. Each set of model data files corresponding to a particular time or each set of model data files present in the training model data store 1575 as of a particular time could be checkpoints that represent different versions of a partially-trained machine learning model during different stages of the training process. Accordingly, before training is complete, a user, via the user device 1502 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 1575.

In some embodiments, a virtual machine instance 1522 executes code 1537 stored in a plurality of ML training containers 1530. For example, the algorithm included in the container image can be in a format that allows for the parallelization of the training process. Thus, the model training system 120 can create multiple copies of the container image provided in a training request and cause the virtual machine instance 1522 to load each container image copy in a separate ML training container 1530. The virtual machine instance 1522 can then execute, in parallel, the code 1537 stored in the ML training containers 1530. The virtual machine instance 1522 can further provide configuration information to each ML training container 1530 (for example, information indicating that N ML training containers 1530 are collectively training a machine learning model and that a particular ML training container 1530 receiving the configuration information is ML training container 1530 number X of N), which can be included in the resulting model data. By parallelizing the training process, the model training system 120 can significantly reduce the training time in some embodiments.

In some embodiments, a plurality of virtual machine instances 1522 execute code 1537 stored in a plurality of ML training containers 1530. For example, the resources used to train a particular machine learning model can exceed the limitations of a single virtual machine instance 1522. However, the algorithm included in the container image can be in a format that allows for the parallelization of the training process. Thus, the model training system 120 can create multiple copies of the container image provided in a training request, initialize multiple virtual machine instances 1522, and cause each virtual machine instance 1522 to load a container image copy in one or more separate ML training containers 1530. The virtual machine instances 1522 can then each execute the code 1537 stored in the ML training containers 1530 in parallel. The model training system 120 can further provide configuration information to each ML training container 1530 via the virtual machine instances 1522 (for example, information indicating that N ML training containers 1530 are collectively training a machine learning model and that a particular ML training container 1530 receiving the configuration information is ML training container 1530 number X of N, information indicating that M virtual machine instances 1522 are collectively training a machine learning model and that a particular ML training container 1530 receiving the configuration information is initialized in virtual machine instance 1522 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 1522 that execute the code 1537. Thus, the parallelization can occur over different physical computing devices in addition to over different virtual machine instances 1522 and/or ML training containers 1530.

In some embodiments, the model training system 120 includes a ML model evaluator 1528. The ML model evaluator 1528 can monitor virtual machine instances 1522 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 1528 can obtain the model data for a machine learning model being trained and evaluation data from the training data store 1560. The evaluation data is separate from the data used to train a machine learning model and includes both input data and expected outputs (for example, known results), and thus the ML model evaluator 1528 can define a machine learning model using the model data and execute the machine learning model by providing the input data as inputs to the machine learning model. The ML model evaluator 1528 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 1528 periodically generates model metrics during the training process and stores the model metrics in the training metrics data store 1565 in some embodiments. While the machine learning model is being trained, a user, via the user device 1502, can access and retrieve the model metrics from the training metrics data store 1565. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 1502, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 1522 to optionally delete an existing ML training container 1530, create and initialize a new ML training container 1530 using some or all of the information included in the request, and execute the code 1537 stored in the new ML training container 1530 to restart the machine learning model training process. As another example, the model training system 120 can cause the virtual machine instance 1522 to modify the execution of code stored in an existing ML training container 1530 according to the data provided in the modification request. In some embodiments, the user, via the user device 1502, can transmit a request to the model training system 120 to stop the machine learning model training process. The model training system 120 can then instruct the virtual machine instance 1522 to delete the ML training container 1530 and/or to delete any model data stored in the training model data store 1575.

As described below, in some embodiments, the model data stored in the training model data store 1575 is used by the model hosting system 140 to deploy machine learning models. Alternatively or additionally, a user device 1502 or another computing device (not shown) can retrieve the model data from the training model data store 1575 to implement a learning algorithm in an external device. As an illustrative example, a robotic device can include sensors to capture input data. A user device 1502 can retrieve the model data from the training model data store 1575 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 1522 are shown in FIG. 15 as a single grouping of virtual machine instances 1522, some embodiments of the present application separate virtual machine instances 1522 that are actively assigned to execute tasks from those virtual machine instances 1522 that are not actively assigned to execute tasks. For example, those virtual machine instances 1522 actively assigned to execute tasks are grouped into an "active pool," while those virtual machine instances 1522 not actively assigned to execute tasks are placed within a "warming pool." In some embodiments, those virtual machine instances 1522 within the warming pool can be pre-initialized with an operating system, language runtimes, and/or other software required to enable rapid execution of tasks (for example, rapid initialization of machine learning model training in ML training container(s) 1530) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 1502, the model hosting system 140, etc.). The processing unit can also communicate to and from a memory of a virtual machine instance 1522 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 1542. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 1502 via frontend 1549 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 1542 are used to execute tasks. For example, such tasks can include executing a machine learning model. As shown in FIG. 15, each virtual machine instance 1542 includes an operating system (OS) 1544, a language runtime 1546, and one or more ML scoring containers 1550. The ML scoring containers 1550 are similar to the ML training containers 1530 in that the ML scoring containers 1550 are logical units created within a virtual machine instance using the resources available on that instance and can be used to isolate execution of a task from other processes (for example, task executions) occurring in the instance. In some embodiments, the ML scoring containers 1550 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 1550 (for example, creation of new files, modification of existing files, deletion of files, etc.) are stored in the top container layer. If a ML scoring container 1550 is deleted, the top container layer is also deleted. However, the container image(s) that form a portion of the deleted ML scoring container 1550 can remain unchanged. The ML scoring containers 1550 can be implemented, for example, as Linux containers.

The ML scoring containers 1550 each include a runtime 1554, code 1556, and dependencies 1552 (for example, supporting software such as libraries) needed by the code 1556 in some embodiments. The runtime 1554 can be defined by one or more executable instructions that form at least a portion of a container image that is used to form the ML scoring container 1550 (for example, the executable instruction(s) in the container image that define the operating system and/or runtime to run in the container formed from the container image). The code 1556 includes one or more executable instructions that form at least a portion of a container image that is used to form the ML scoring container 1550. For example, the code 1556 includes the executable instructions in the container image that represent an algorithm that defines a machine learning model, which may reference dependencies 1552. The code 1556 can also include model data that represent characteristics of the defined machine learning model, as described in greater detail below. The runtime 1554 is configured to execute the code 1556 in response to an instruction to begin execution of a machine learning model. Execution of the code 1556 results in the generation of outputs (for example, predicted results), as described in greater detail below.

In some embodiments, the runtime 1554 is the same as the runtime 1546 used by the virtual machine instance 1542. In some embodiments, runtime 1554 is different than the runtime 1546 used by the virtual machine instance 1542.

In some embodiments, the model hosting system 140 uses one or more container images included in a deployment request (or a container image retrieved from the container data store 1570 in response to a received deployment request) to create and initialize a ML scoring container 1550 in a virtual machine instance 1542. For example, the model hosting system 140 creates a ML scoring container 1550 that includes the container image(s) and/or a top container layer.

As described above, a user device 1502 can submit a deployment request and/or an execution request to the model hosting system 140 via the frontend 1549 in some embodiments. A deployment request causes the model hosting system 140 to deploy a trained machine learning model into a virtual machine instance 1542. For example, the deployment request can include an identification of an endpoint (for example, an endpoint name, such as an HTTP endpoint name) and an identification of one or more trained machine learning models (for example, a location of one or more model data files stored in the training model data store 1575). Optionally, the deployment request also includes an identification of one or more container images stored in the container data store 1570.

Upon receiving the deployment request, the model hosting system 140 initializes ones or more ML scoring containers 1550 in one or more hosted virtual machine instance 1542. In embodiments in which the deployment request includes an identification of one or more container images, the model hosting system 140 forms the ML scoring container(s) 1550 from the identified container image(s). For example, a container image identified in a deployment request can be the same container image used to form an ML training container 1530 used to train the machine learning model corresponding to the deployment request. Thus, the code 1556 of the ML scoring container(s) 1550 includes one or more executable instructions in the container image(s) that represent an algorithm that defines a machine learning model. In embodiments in which the deployment request does not include an identification of a container image, the model hosting system 140 forms the ML scoring container(s) 1550 from one or more container images stored in the container data store 1570 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 1550 by retrieving model data corresponding to the identified trained machine learning model(s) in some embodiments. For example, the deployment request can identify a location of model data file(s) stored in the training model data store 1575. In embodiments in which a single model data file is identified in the deployment request, the model hosting system 140 retrieves the identified model data file from the training model data store 1575 and inserts the model data file into a single ML scoring container 1550, which forms a portion of code 1556. In some embodiments, the model data file is archived or compressed (for example, formed from a package of individual files). Thus, the model hosting system 140 unarchives or decompresses the model data file to obtain multiple individual files and inserts the individual files into the ML scoring container 1550. In some embodiments, the model hosting system 140 stores the model data file in the same location as the location in which the model data file was stored in the ML training container 1530 that generated the model data file. For example, the model data file initially was stored in the top container layer of the ML training container 1530 at a certain offset, and the model hosting system 140 then stores the model data file in the top container layer of the ML scoring container 1550 at the same offset.

In embodiments in which multiple model data files are identified in the deployment request, the model hosting system 140 retrieves the identified model data files from the training model data store 1575. The model hosting system 140 can insert the model data files into the same ML scoring container 1550, into different ML scoring containers 1550 initialized in the same virtual machine instance 1542, or into different ML scoring containers 1550 initialized in different virtual machine instances 1542. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 1550 with the endpoint identified in the deployment request. For example, each of the initialized ML scoring container(s) 1550 can be associated with a network address. The model hosting system 140 can map the network address(es) to the identified endpoint, and the model hosting system 140 or another system (for example, a routing system, not shown) can store the mapping. Thus, a user device 1502 can refer to trained machine learning model(s) stored in the ML scoring container(s) 1550 using the endpoint. This allows for the network address of an ML scoring container 1550 to change without causing the user operating the user device 1502 to change the way in which the user refers to a trained machine learning model.

Once the ML scoring container(s) 1550 are initialized, the ML scoring container(s) 1550 are ready to execute trained machine learning model(s). In some embodiments, the user device 1502 transmits an execution request to the model hosting system 140 via the frontend 1549, where the execution request identifies an endpoint and includes an input to a machine learning model (for example, a set of input data). The model hosting system 140 or another system (for example, a routing system, not shown) can obtain the execution request, identify the ML scoring container(s) 1550 corresponding to the identified endpoint, and route the input to the identified ML scoring container(s) 1550.

In some embodiments, a virtual machine instance 1542 executes the code 1556 stored in an identified ML scoring container 1550 in response to the model hosting system 140 receiving the execution request. In particular, execution of the code 1556 causes the executable instructions in the code 1556 corresponding to the algorithm to read the model data file stored in the ML scoring container 1550, use the input included in the execution request as an input parameter, and generate a corresponding output. As an illustrative example, the algorithm can include coefficients, weights, layers, cluster centroids, and/or the like. The executable instructions in the code 1556 corresponding to the algorithm can read the model data file to determine values for the coefficients, weights, layers, cluster centroids, and/or the like. The executable instructions can include input parameters, and the input included in the execution request can be supplied by the virtual machine instance 1542 as the input parameters. With the machine learning model characteristics and the input parameters provided, execution of the executable instructions by the virtual machine instance 1542 can be completed, resulting in an output.

In some embodiments, the virtual machine instance 1542 stores the output in the model prediction data store 1580. Alternatively or in addition, the virtual machine instance 1542 transmits the output to the user device 1502 that submitted the execution result via the frontend 1549.

In some embodiments, the execution request corresponds to a group of related trained machine learning models. Thus, the ML scoring container 1550 can transmit the output to a second ML scoring container 1550 initialized in the same virtual machine instance 1542 or in a different virtual machine instance 1542. The virtual machine instance 1542 that initialized the second ML scoring container 1550 can then execute second code 1556 stored in the second ML scoring container 1550, providing the received output as an input parameter to the executable instructions in the second code 1556. The second ML scoring container 1550 further includes a model data file stored therein, which is read by the executable instructions in the second code 1556 to determine values for the characteristics defining the machine learning model. Execution of the second code 1556 results in a second output. The virtual machine instance 1542 that initialized the second ML scoring container 1550 can then transmit the second output to the model prediction data store 1580 and/or the user device 1502 via the frontend 1549 (for example, if no more trained machine learning models are needed to generate an output) or transmit the second output to a third ML scoring container 1550 initialized in the same or different virtual machine instance 1542 (for example, if outputs from one or more additional trained machine learning models are needed), and the above-referenced process can be repeated with respect to the third ML scoring container 1550.

While the virtual machine instances 1542 are shown in FIG. 15 as a single grouping of virtual machine instances 1542, some embodiments of the present application separate virtual machine instances 1542 that are actively assigned to execute tasks from those virtual machine instances 1542 that are not actively assigned to execute tasks. For example, those virtual machine instances 1542 actively assigned to execute tasks are grouped into an "active pool," while those virtual machine instances 1542 not actively assigned to execute tasks are placed within a "warming pool." In some embodiments, those virtual machine instances 1542 within the warming pool can be pre-initialized with an operating system, language runtimes, and/or other software required to enable rapid execution of tasks (for example, rapid initialization of ML scoring container(s) 1550, rapid execution of code 1556 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 1502, the model training system 120, etc.). The processing unit can also communicate to and from a memory of a virtual machine instance 1542 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 15 are not meant to be limiting. For example, the model training system 120 and/or the model hosting system 140 could also operate within a computing environment having a fewer or greater number of devices than are illustrated in FIG. 15. Thus, the depiction of the model training system 120 and/or the model hosting system 140 in FIG. 15 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 1529 processes all training requests received from user devices 1502 and provisions virtual machine instances 1522. In some embodiments, the frontend 1529 serves as a front door to all the other services provided by the model training system 120. The frontend 1529 processes the requests and makes sure that the requests are properly authorized. For example, the frontend 1529 may determine whether the user associated with the training request is authorized to initiate the training process.

Similarly, frontend 1549 processes all deployment and execution requests received from user devices 1502 and provisions virtual machine instances 1542. In some embodiments, the frontend 1549 serves as a front door to all the other services provided by the model hosting system 140. The frontend 1549 processes the requests and makes sure that the requests are properly authorized. For example, the frontend 1549 may determine whether the user associated with a deployment request or an execution request is authorized to access the indicated model data and/or to execute the indicated machine learning model.

The training data store 1560 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 1560 is depicted as being located external to the model training system 120 and the model hosting system 140, this is not meant to be limiting. For example, in some embodiments not shown, the training data store 1560 is located internal to at least one of the model training system 120 or the model hosting system 140.

In some embodiments, the training metrics data store 1565 stores model metrics. While the training metrics data store 1565 is depicted as being located external to the model training system 120 and the model hosting system 140, this is not meant to be limiting. For example, in some embodiments not shown, the training metrics data store 1565 is located internal to at least one of the model training system 120 or the model hosting system 140.

The container data store 1570 stores container images, such as container images used to form ML training containers 1530 and/or ML scoring containers 1550, that can be retrieved by various virtual machine instances 1522 and/or 1542. While the container data store 1570 is depicted as being located external to the model training system 120 and the model hosting system 140, this is not meant to be limiting. For example, in some embodiments not shown, the container data store 1570 is located internal to at least one of the model training system 120 and the model hosting system 140.

The training model data store 1575 stores model data files. In some embodiments, some of the model data files are comprised of a single file, while other model data files are packages of multiple individual files. While the training model data store 1575 is depicted as being located external to the model training system 120 and the model hosting system 140, this is not meant to be limiting. For example, in some embodiments not shown, the training model data store 1575 is located internal to at least one of the model training system 120 or the model hosting system 140.

The model prediction data store 1580 stores outputs (for example, execution results) generated by the ML scoring containers 1550 in some embodiments. While the model prediction data store 1580 is depicted as being located external to the model training system 120 and the model hosting system 140, this is not meant to be limiting. For example, in some embodiments not shown, the model prediction data store 1580 is located internal to at least one of the model training system 120 and the model hosting system 140.

While the model training system 120, the model hosting system 140, the training data store 1560, the training metrics data store 1565, the container data store 1570, the training model data store 1575, and the model prediction data store 1580 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 1502 via the one or more network(s) 106.

Various example user devices 1502 are shown in FIG. 15, including a desktop computer, laptop, and a mobile phone, each provided by way of illustration. In general, the user devices 1502 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 1502 with one or more user interfaces, command-line interfaces (CLI), application programing interfaces (API), and/or other programmatic interfaces for submitting training requests, deployment requests, and/or execution requests. In some embodiments, the user devices 1502 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 16:
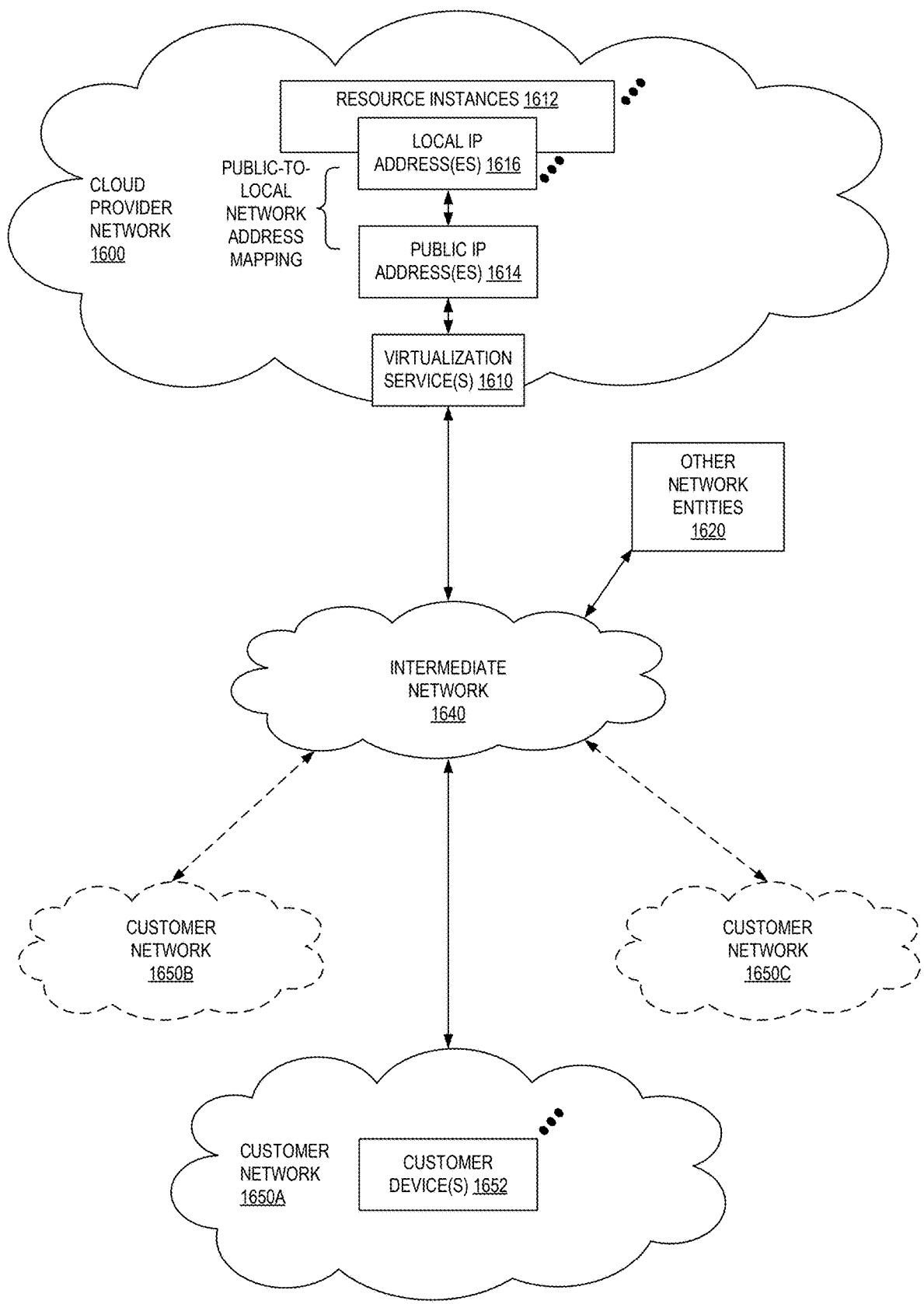
FIG. 16 illustrates an example cloud provider network environment according to some examples.

FIG. 16 illustrates an example provider network (or "service provider system") environment according to some examples. A provider network 1600 can provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 can be associated with the resource instances 1612; the local IP addresses are the internal network addresses of the resource instances 1612 on the provider network 1600. In some examples, the provider network 1600 can also provide public IP addresses 1614 and/or public IP address ranges (e.g., Internet Protocol version 4 (IPv4) or Internet Protocol version 6 (IPv6) addresses) that customers can obtain from the provider 1600.

Conventionally, the provider network 1600, via the virtualization services 1610, can allow a customer of the service provider (e.g., a customer that operates one or more customer networks 1650A-1650C (or "client networks") including one or more customer device(s) 1652) to dynamically associate at least some public IP addresses 1614 assigned or allocated to the customer with particular resource instances 1612 assigned to the customer. The provider network 1600 can also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of the customer network(s) 1650A-1650C can, for example, implement customer-specific applications and present the customer's applications on an intermediate network 1640, such as the Internet. Other network entities 1620 on the intermediate network 1640 can then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 can be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1600; a customer can then assign their allocated public IP addresses to particular resource instances allocated to the customer. These public IP addresses can be referred to as customer public IP addresses, or simply customer IP addresses. Instead of being assigned by the provider network 1600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
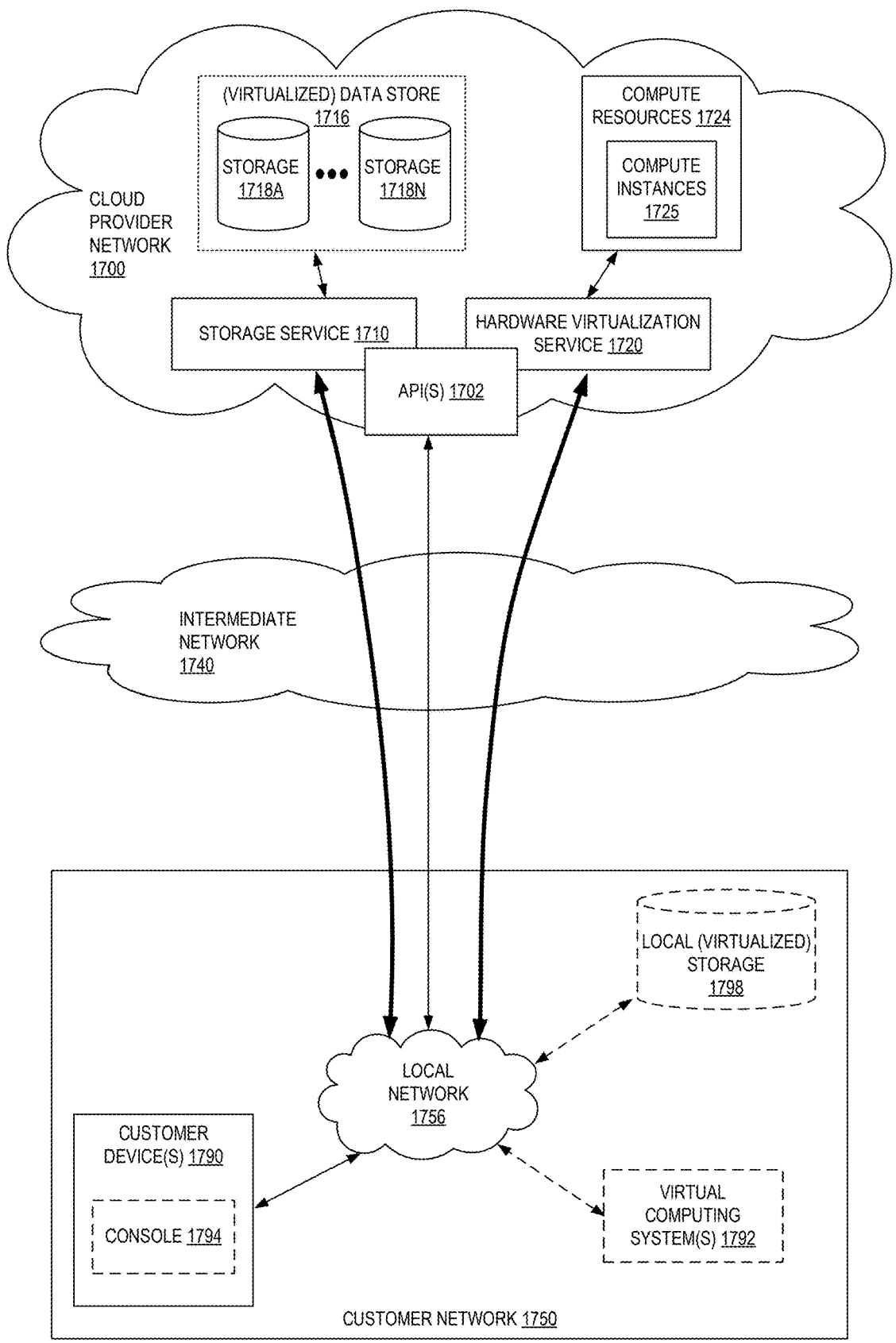
FIG. 17 is a block diagram of an example cloud provider network that provides a storage service and a hardware virtualization service to customers according to some examples.

FIG. 17 is a block diagram of an example provider network environment that provides a storage service and a hardware virtualization service to customers, according to some examples. A hardware virtualization service 1720 provides multiple compute resources 1724 (e.g., compute instances 1725, such as VMs) to customers. The compute resources 1724 can, for example, be provided as a service to customers of a provider network 1700 (e.g., to a customer that implements a customer network 1750). Each computation resource 1724 can be provided with one or more local IP addresses. The provider network 1700 can be configured to route packets from the local IP addresses of the compute resources 1724 to public Internet destinations, and from public Internet sources to the local IP addresses of the compute resources 1724.

The provider network 1700 can provide the customer network 1750, for example coupled to an intermediate network 1740 via a local network 1756, the ability to implement virtual computing systems 1792 via the hardware virtualization service 1720 coupled to the intermediate network 1740 and to the provider network 1700. In some examples, the hardware virtualization service 1720 can provide one or more APIs 1702, for example a web services interface, via which the customer network 1750 can access functionality provided by the hardware virtualization service 1720, for example via a console 1794 (e.g., a web-based application, standalone application, mobile application, etc.) of a customer device 1790. In some examples, at the provider network 1700, each virtual computing system 1792 at the customer network 1750 can correspond to a computation resource 1724 that is leased, rented, or otherwise provided to the customer network 1750.

From an instance of the virtual computing system(s) 1792 and/or another customer device 1790 (e.g., via console 1794), the customer can access the functionality of a storage service 1710, for example via the one or more APIs 1702, to access data from and store data to storage resources 1718A-1718N of a virtual data store 1716 (e.g., a folder or "bucket," a virtualized volume, a database, etc.) provided by the provider network 1700. In some examples, a virtualized data store gateway (not shown) can be provided at the customer network 1750 that can locally cache at least some data, for example frequently accessed or critical data, and that can communicate with the storage service 1710 via one or more communications channels to upload new or modified data from a local cache so that the primary store of data (the virtualized data store 1716) is maintained. In some examples, a user, via the virtual computing system 1792 and/or another customer device 1790, can mount and access virtual data store 1716 volumes via the storage service 1710 acting as a storage virtualization service, and these volumes can appear to the user as local (virtualized) storage 1798.

While not shown in FIG. 17, the virtualization service(s) can also be accessed from resource instances within the provider network 1700 via the API(s) 1702. For example, a customer, appliance service provider, or other entity can access a virtualization service from within a respective virtual network on the provider network 1700 via the API(s) 1702 to request allocation of one or more resource instances within the virtual network or within another virtual network.

Illustrative Systems

Figure 18:
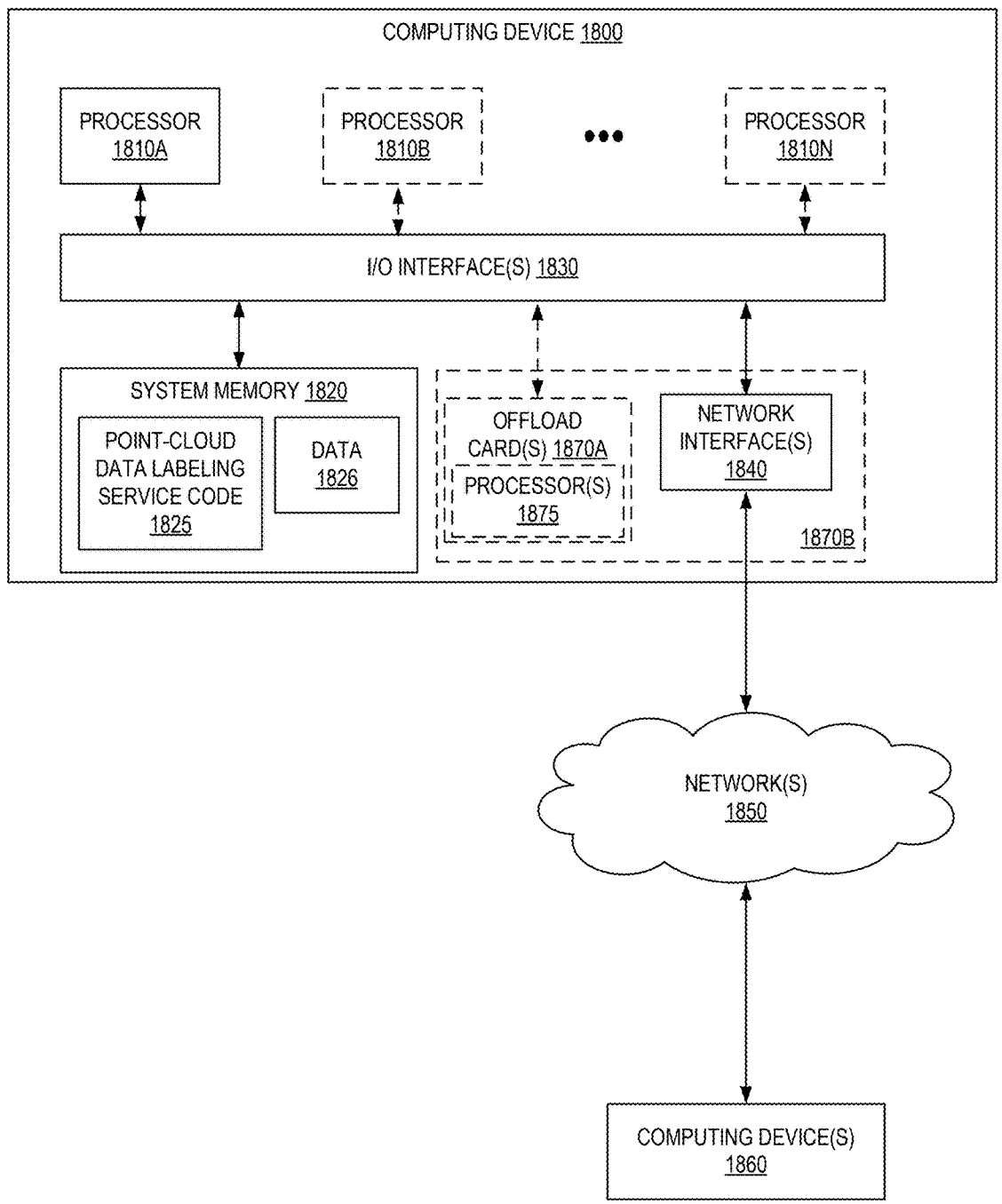
FIG. 18 is a block diagram illustrating an example computing device that can be used in some examples.

In some examples, a system that implements a portion or all of the techniques described herein can include a general-purpose computer system, such as the computing device 1800 (also referred to as a computing system or electronic device) illustrated in FIG. 18, that includes, or is configured to access, one or more computer-accessible media. In the illustrated example, the computing device 1800 includes one or more processors 1810 coupled to a system memory 1820 via an input/output (I/O) interface 1830. The computing device 1800 further includes a network interface 1840 coupled to the I/O interface 1830. While FIG. 18 shows the computing device 1800 as a single computing device, in various examples the computing device 1800 can include one computing device or any number of computing devices configured to work together as a single computing device 1800.

In various examples, the computing device 1800 can be a uniprocessor system including one processor 1810, or a multiprocessor system including several processors 1810 (e.g., two, four, eight, or another suitable number). The processor(s) 1810 can be any suitable processor(s) capable of executing instructions. For example, in various examples, the processor(s) 1810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1810 can commonly, but not necessarily, implement the same ISA.

The system memory 1820 can store instructions and data accessible by the processor(s) 1810. In various examples, the system memory 1820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1820 as point-cloud frame labeling service code 1825 (e.g., executable to implement, in whole or in part, the point-cloud frame labeling service 110) and data 1826.

In some examples, the I/O interface 1830 can be configured to coordinate I/O traffic between the processor 1810, the system memory 1820, and any peripheral devices in the device, including the network interface 1840 and/or other peripheral interfaces (not shown). In some examples, the I/O interface 1830 can perform any necessary protocol, timing, or other data transformations to convert data signals from one component (e.g., the system memory 1820) into a format suitable for use by another component (e.g., the processor 1810). In some examples, the I/O interface 1830 can include support for devices attached through various types of peripheral buses, such as a variant of the Peripheral Component Interconnect (PCI) bus standard or the Universal Serial Bus (USB) standard, for example. In some examples, the function of the I/O interface 1830 can be split into two or more separate components, such as a north bridge and a south bridge, for example. Also, in some examples, some or all of the functionality of the I/O interface 1830, such as an interface to the system memory 1820, can be incorporated directly into the processor 1810.

The network interface 1840 can be configured to allow data to be exchanged between the computing device 1800 and other computing devices 1860 attached to a network or networks 1850, such as other computer systems or devices as illustrated in FIG. 1, for example. In various examples, the network interface 1840 can support communication via any suitable wired or wireless general data networks, such as types of Ethernet network, for example. Additionally, the network interface 1840 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1800 includes one or more offload cards 1870A or 1870B (including one or more processors 1875, and possibly including the one or more network interfaces 1840) that are connected using the I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1800 can act as a host electronic device (e.g., operating as part of a hardware virtualization service) that hosts compute resources such as compute instances, and the one or more offload cards 1870A or 1870B execute a virtualization manager that can manage compute instances that execute on the host electronic device. As an example, in some examples the offload card(s) 1870A or 1870B can perform compute instance management operations, such as pausing and/or un-pausing compute instances, launching and/or terminating compute instances, performing memory transfer/copying operations, etc. These management operations can, in some examples, be performed by the offload card(s) 1870A or 1870B in coordination with a hypervisor (e.g., upon a request from a hypervisor) that is executed by the other processors 1810A-1810N of the computing device 1800. However, in some examples the virtualization manager implemented by the offload card(s) 1870A or 1870B can accommodate requests from other entities (e.g., from compute instances themselves), and cannot coordinate with (or service) any separate hypervisor.

In some examples, the system memory 1820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1800 via the I/O interface 1830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1800 as the system memory 1820 or another type of memory. Further, a computer-accessible medium can include transmission media or signals such as electrical, electromagnetic, or digital signals, conveyed via a communication medium such as a network and/or a wireless link, such as can be implemented via the network interface 1840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1718A-1718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving a configuration for a point-cloud frame labeling service;
   initializing a point-cloud environment in a virtual reality (VR) device according to the configuration;
   loading point-cloud data and 3D bounding boxes into a memory buffer of the VR device, wherein the point-cloud data is compatible with a VR environment and a non-VR environment;
   drawing the loaded point-cloud data and 3D cuboid annotations by the VR device;
   receiving user input in a task user interface of the VR device; and
   in response to the input, performing an operation to a bounding box.

2. The computer-implemented method of claim 1, further comprising converting point-cloud data from a first format into a second format that is compatible with virtual reality-based browsers and computer-based browsers.

3. The computer-implemented method of claim 2, wherein the second format comprises:
   coordinate system information;
   virtual reality transform and origin information; and
   a point-cloud vertex list.

4. A computer-implemented method comprising:
   initializing a point-cloud environment according to a configuration;
   loading point-cloud data into a memory buffer of a device, wherein the point-cloud data is compatible with a virtual reality (VR) environment and a non-VR environment;
   drawing of at least the loaded point-cloud data into a point-cloud environment of the device;
   receiving user input in a task user interface of the device; and
   in response to the user input, performing an operation to one or more of a bounding box and quality of a label.

5. The computer-implemented method of claim 4, further comprising:
   converting point-cloud data from a first format into a second format that is compatible with virtual reality-based browsers and computer-based browsers.

6. The computer-implemented method of claim 5, wherein the second format comprises:
   coordinate system information;
   virtual reality transform and origin information; and
   a point-cloud vertex list.

7. The computer-implemented method of claim 4, wherein the initializing a point-cloud environment comprises:
   launching one or more jobs in a machine learning model training service to provide an interface between point-cloud data stored by a provider network and the device.

8. The computer-implemented method of claim 4, further comprising:

loading 3D bounding boxes into a memory buffer; and drawing 3D cuboid annotations for the loaded 3D-bounding boxes.

9. The computer-implemented method of claim 4, wherein the device is a virtual reality headset.

10. The computer-implemented method of claim 9, wherein the input is a captured hand gesture to create a bounding box and the task user interface is to render the bounding box including changing a color for point-cloud data to reflect the bounding box.

11. The computer-implemented method of claim 9, wherein the input is a captured hand gesture to update a bounding box and the task user interface is to render the updated bounding box including changing a color for point-cloud data to reflect the updated bounding box.

12. The computer-implemented method of claim 9, wherein the input is a captured hand gesture to update a point-cloud data point and the task user interface is to change a color for point-cloud data to reflect the updated point-cloud data point.

13. The computer-implemented method of claim 9, wherein the input is a captured hand gesture to receive feedback and the task user interface is to determine a quality for a bounding box associated with the captured hand gesture, wherein the feedback is generated based on labeled data or from a machine learning model.

14. The computer-implemented method of claim 4, wherein the input is a label quality indication.

15. The computer-implemented method of claim 4, wherein edges of rendered bounding boxes have a values for red, green, blue, and transparency.

16. A system comprising:
a first one or more computing devices to implement a storage service in a multi-tenant provider network; and
a second one or more computing devices to implement a point-cloud data labeling service in the multi-tenant provider network, the point-cloud data labeling service including instructions that upon execution cause the point-cloud data labeling service to:
  initialize a point-cloud environment according to a configuration;
  load point-cloud data from the storage service into a memory buffer of a device, wherein the point-cloud data is compatible with a virtual reality (VR) environment and a non-VR environment;
  draw of at least the loaded point-cloud data into a point-cloud environment of the device;
  receive user input in a task user interface of the device; and
  in response to the user input, perform an operation to one or more of a bounding box and quality of a label.

17. The system of claim 16, wherein the point-cloud data is in a format that comprises:
coordinate system information;
virtual reality transform and origin information; and
a point-cloud vertex list.

18. The system of claim 16, wherein edges of rendered bounding boxes have a values for red, green, blue, and transparency.

19. The system of claim 16, further comprising:
a virtual reality device, wherein the device is the virtual reality device.

20. The system of claim 16, wherein the device is a desktop computer.

* * * * *